United States Patent [19]

Hashimoto

[11] Patent Number: 5,231,550
[45] Date of Patent: Jul. 27, 1993

[54] TRACK ACCESS CONTROL SYSTEM PREVENTING UNINTENTIONAL DELAY IN MOVEMENT OF HEAD IN NON-ADJUSTED DISC DEVICE

[75] Inventor: Shuichi Hashimoto, Tokyo, Japan
[73] Assignee: Fujitsu Limited, Kanagawa, Japan
[21] Appl. No.: 667,164
[22] Filed: Mar. 11, 1991

[30] Foreign Application Priority Data

| Mar. 12, 1990 [JP] | Japan | 2-058188 |
| Mar. 12, 1990 [JP] | Japan | 2-058189 |
| Mar. 20, 1990 [JP] | Japan | 2-068058 |

[51] Int. Cl.$^5$ ............... G11B 21/02; G11B 5/596
[52] U.S. Cl. ................... 360/78.06; 360/75; 360/77.06; 360/77.08; 360/78.07; 360/78.09
[58] Field of Search ............ 360/75, 77.06, 77.08, 360/78.06, 78.07, 78.09

[56] References Cited

U.S. PATENT DOCUMENTS

| 4,006,394 | 2/1977 | Cuda et al. | 360/78.09 |
| 4,133,011 | 1/1979 | Kurzweil, Jr. | 360/78.09 |
| 4,720,754 | 1/1988 | Mizoshita et al. | 360/77 |
| 4,884,152 | 11/1989 | Ide | 360/75 |
| 4,908,561 | 3/1990 | Hashimoto | 318/677 |
| 4,963,806 | 10/1990 | Shinohara et al. | 318/621 |
| 4,965,501 | 10/1990 | Hashimoto | 318/595 |
| 4,993,201 | 1/1990 | Emori et al. | 360/77.04 |
| 5,046,058 | 9/1991 | Shimonou | 360/78.09 |

FOREIGN PATENT DOCUMENTS 62-262283 11/1987 Japan.
1-207807 8/1989 Japan.
1205773 8/1989 Japan.
1-258278 10/1989 Japan.
2011654 7/1979 United Kingdom ............ 360/78.09

OTHER PUBLICATIONS

IBM Tech. Disc. Bul. vol. 25, No. 9 Feb. 1983 "Track seek using continuous servo" Hansen et al. pp. 4572-4576.

*Primary Examiner*—Margaret R. Wambach
*Attorney, Agent, or Firm*—Nikaido, Marmelstein, Murray & Oram

[57] ABSTRACT

A track access control system which is used in a rotating disc device, for positioning a servo head above a desired track by speed control and then position control. A timer starts when the head reaches a predetermined position which is out of a predetermined vicinity of the desired track, and when in the vicinity, the control is switched from the speed control to the position control. After a predetermined time has elapsed after the head reaches the predetermined position, the target speed is increased to push the head. Alternatively, after the predetermined time has elapsed after the head reaches the predetermined position, the control may be immediately switched from the speed control to the position control. In addition, in a return-to-zero operation, intervals between times the servo head passes over different tracks are monitored to detect a real speed of the head, and the target speed during the speed control is controlled according to the detected real speed.

12 Claims, 20 Drawing Sheets

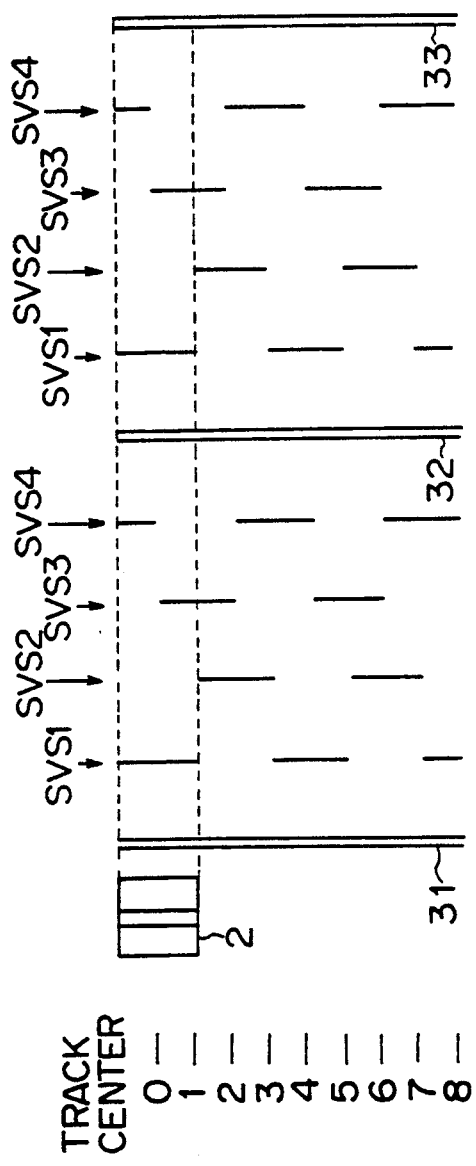
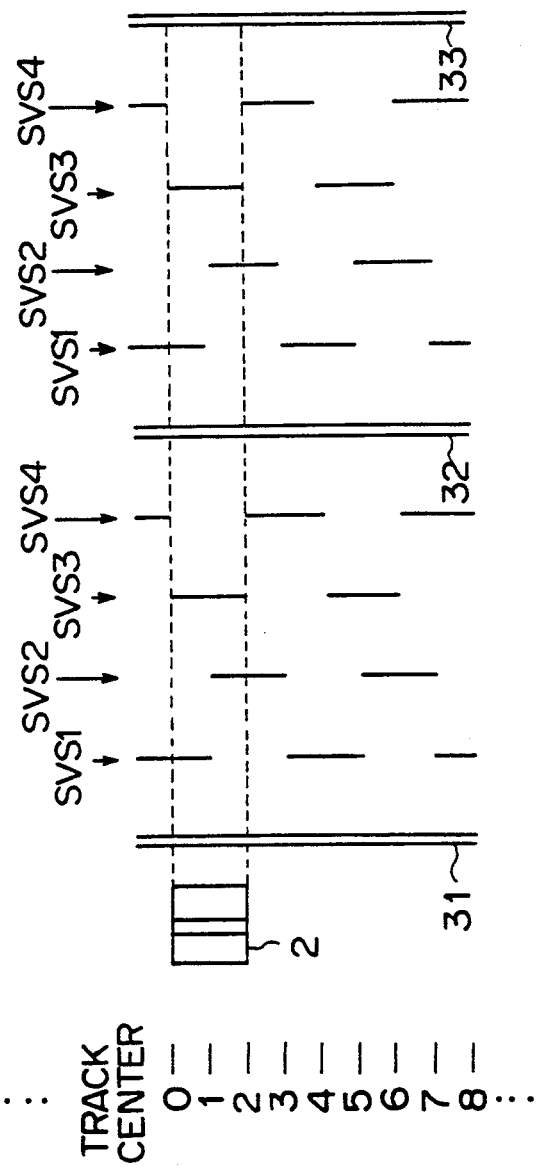
Fig. 3A
Fig. 3B

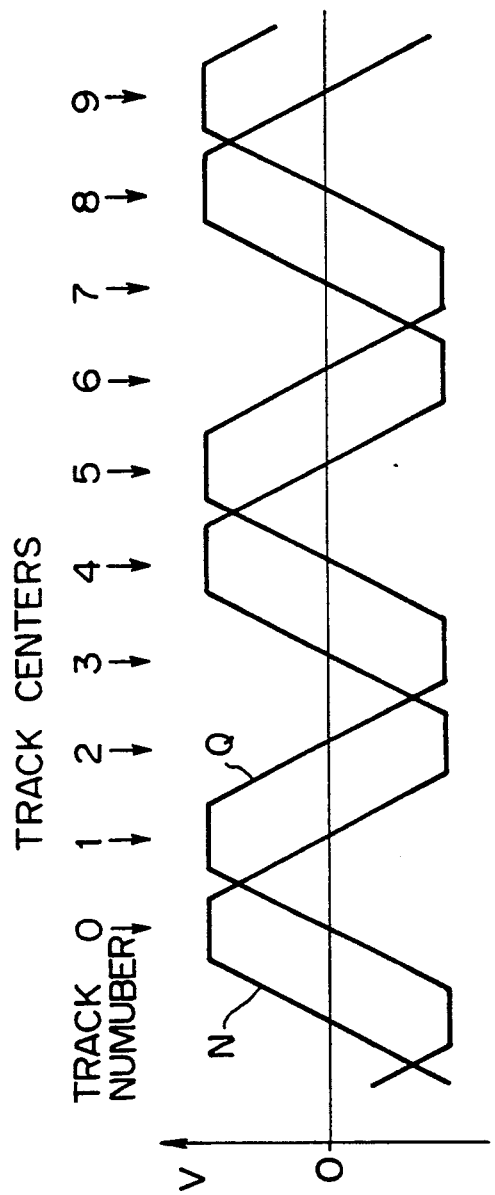

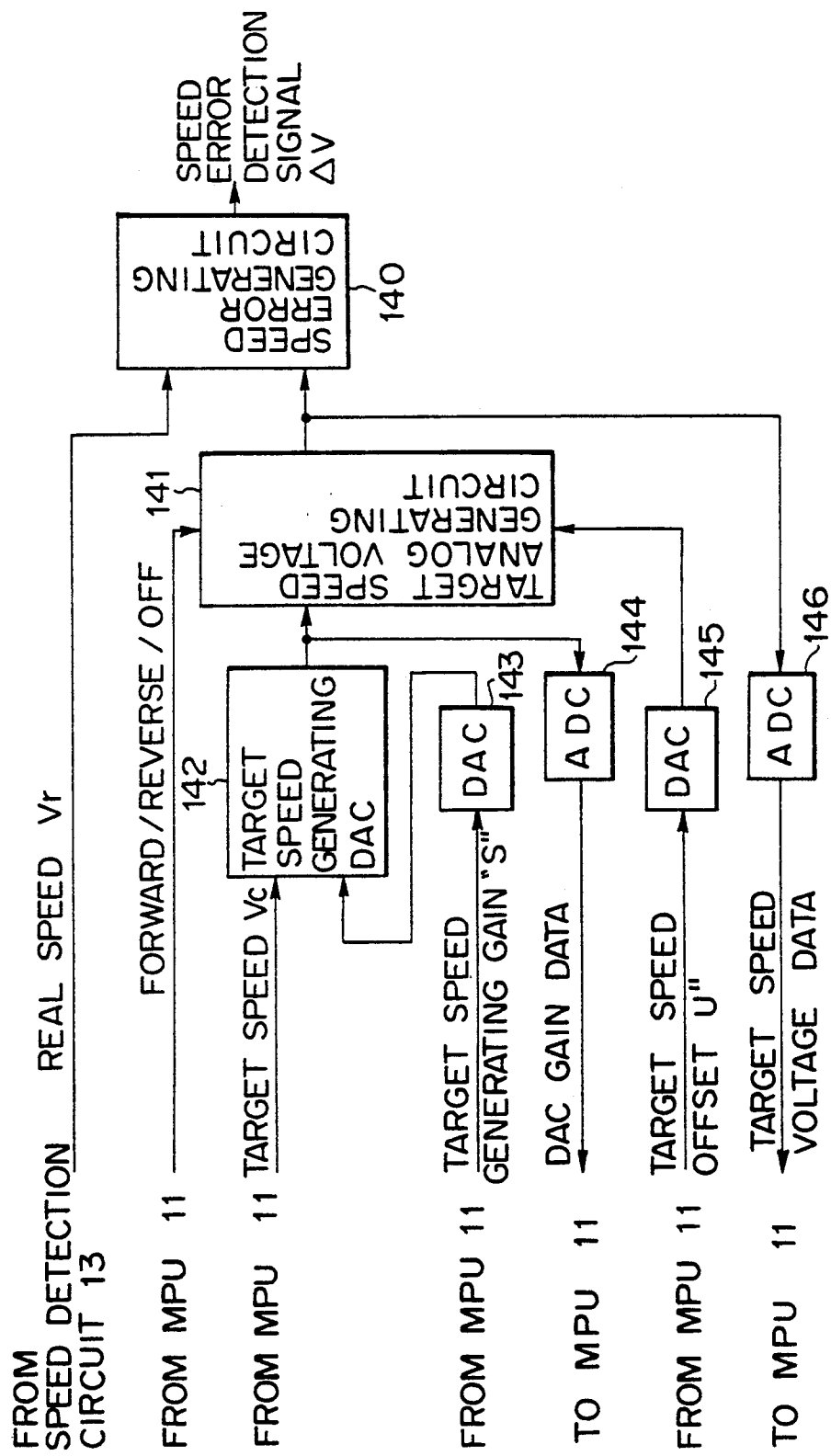

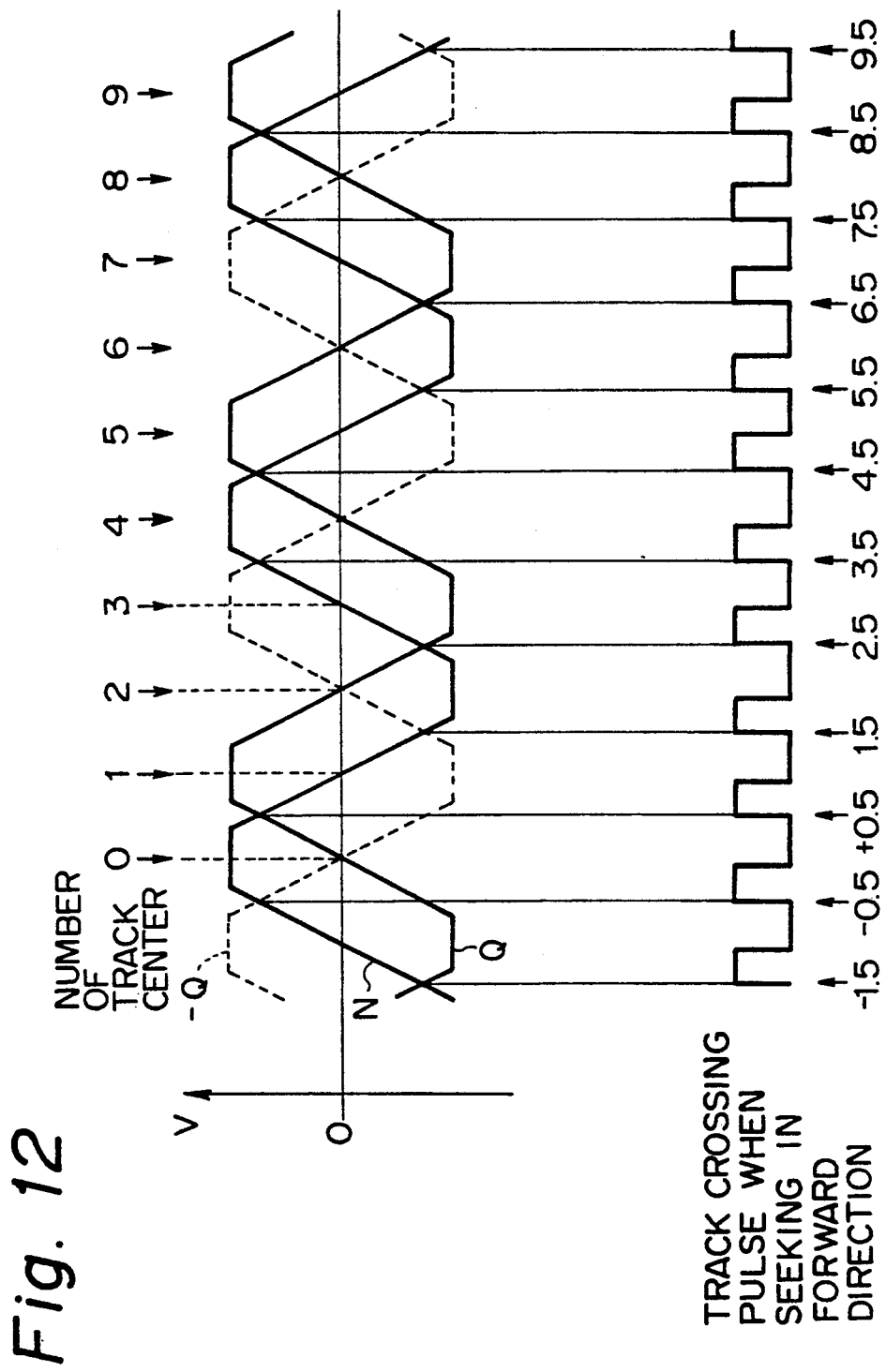

TRACK ACCESS CONTROL SYSTEM PREVENTING UNINTENTIONAL DELAY IN MOVEMENT OF HEAD IN NON-ADJUSTED DISC DEVICE

CROSS REFERENCE TO RELATED APPLICATION

This application is related to copending application Ser. No. 460, 657, filed Jan. 3, 1990, by the same inventor as the subject application.

BACKGROUND OF THE INVENTION

(1) Field of the Invention

The present invention relates to a track access control system including coarse and fine (speed and position) control for positioning a head (for example, magnetic or optical head) for writing and/or reading data, above a target track on a surface of a rotating disc (for example, magnetic or magneto-optical disc) on which digital data is memorized, in a rotating disc device (for example, magnetic or magneto-optical disc device).

(2) Description of the Related Art

The track access control system in the rotating disc device is a servo control system wherein information on a real speed of the head and a real driving current of a moving mechanism (for example, a voice coil motor) of the head, are fedback to a controller of the track access control system, and the moving mechanism is controlled based on a target speed of the head and the above fedback information, in the coarse (speed) control operation; and information on a real position of the head is fedback to the controller to control the moving mechanism to position the head above the target track, in the fine (position) control operation. In the track access control system, there are a plurality of parameters which are to be adjusted to optimum values, in a factory before packing for shipment.

Until now, the above track access control system has been automatically adjusted to the optimum setting condition by trial and error. That is, the optimum setting condition is obtained by giving various values for the above parameters, and examining the performance of the track access control system for the various values. The operation of the automatic adjustment is described in detail in the above copending application Ser. No. 460, 657.

However, during a coarse (speed) control operation which is carried out in the above automatic adjustment operation, or other operations for examining the track access control system preceding the adjustment operation, the movement of the head often stops unintentionally due to the track access control system being out of the optimum condition. When the head stops at an intended position, the above automatic adjustment operation, or the above other operation for examining the track access control system cannot be further continued automatically, so that such a situation is recognized as an error, and causes problems and delay in the above operations. Further, a similar unintentional stop may occur during use of the rotating disc device due to a deviation from the optimum condition by aging, or an influence of an external disturbance.

In addition, a return-to-zero operation is often required to be carried out during the above automatic adjustment operation, or other operation of the track access control system before and after the adjustment operation. The return-to-zero operation is an operation to position the head above the zero track, and is carried out to initialize the position of the head. A very small target speed is used in the return-to-zero operation because, generally, it is unknown how far from the zero track position the starting position of the head is. The present applicant found that, when the track access control system is out of the optimum condition before the adjustment or due to aging or an external disturbance, the real speed of the head is likely to be much smaller than a target speed for the coarse (speed) control operation in the return-to-zero operation, thus causing a great deal of delay in the return-to-zero operation. Therefore, the efficiency of the above operation is greatly reduced by the above delay.

SUMMARY OF THE INVENTION

An object of the present invention is to provide a track access control system wherein an unintentional stop which may occur during a coarse (speed) control operation is automatically released so that an operation of positioning a head above a target track can be continued.

Another object of the present invention is to provide a track access control system wherein a delay due to deviation from an optimum condition in a coarse (speed) control operation during a return-to-zero operation is automatically compensated.

According to the first aspect of the present invention, there is provided a track access control system for use in a rotating disc device comprising: a head for writing and/or reading digital data on a memory disc on which a plurality of tracks are provided; a moving means for moving the head over all of the tracks on the memory disc; and a servo control means for controlling the moving means so that the head is moved to and positioned above a target track. The servo control means comprises: a real speed detecting means for detecting a real speed of the head; a speed error obtaining means for obtaining a difference between the real speed and a target speed for moving the head; a speed control means for controlling the moving means so that the head is moved at a speed according to the above difference so that the real speed approaches the target speed; a real position detecting means for detecting a real position of the head; a position control means for controlling the moving means so that the head is positioned above a target track, using the detected real position; a switching means for effecting the operation of the speed control means until the real position reaches a predetermined vicinity of the target track, and effecting the operation of the position control means after the real position reached the predetermined vicinity; a timer starting position detecting means for detecting the head reaching a predetermined position out of the predetermined vicinity; a timer for detecting a predetermined time elapsing from the time the head reaches the predetermined position; and a target speed increasing means for forcing an increase in the target speed for the use in the operation of the speed error obtaining means, when the elapse of the predetermined time is detected before the head reaches the predetermined vicinity.

According to the second aspect of the present invention, there is provided a track access control system for use in a rotating disc device comprising: a head for writing and/or reading digital data on a memory disc on which a plurality of tracks are provided; a moving means for moving the head over all of the tracks on the memory disc; and a servo control means for controlling the moving means so that the head is moved to and positioned above a target track. The servo control means comprises: a real speed detecting means for detecting a real speed of the head; a speed control means for controlling the moving means so that the head is moved to a predetermined vicinity of a target track, using the detected real speed; a real position detecting means for detecting a real position of the head; a position control means for controlling the moving means so that the head is positioned above a target track, using the detected real position; a switching means for effecting the operation of the speed control means until the real position reaches the predetermined vicinity, and effecting the operation of the position control means after the real position reaches the predetermined vicinity; a timer starting position detecting means for detecting the head reaching a predetermined position which is out of the above predetermined vicinity; a timer for detecting a predetermined time elapsing from the time the head reaches the predetermined position; and a forced switching means for effecting the operation of the position control means when the elapse of the predetermined time is detected before the head reaches the predetermined vicinity.

According to the third aspect of the present invention, there is provided a track access control system for use in a rotating disc device comprising: a head for writing and/or reading digital data on a memory disc on which a plurality of tracks are provided; a moving means for moving the head over all of the tracks on the memory disc; and a servo control means for controlling the moving means so that the head is moved to and positioned above a target track. The servo control means comprises: a real speed detecting means for detecting a real speed of the head; a speed error obtaining means for obtaining a difference between the real speed and a target speed for moving the head; a speed control means for controlling the moving means so that the head is moved at a speed according to the above difference so that the real speed approaches the target speed; a track crossing timing detecting means for detecting a time the head passes over each track on the memory disc; an interval detecting means for detecting an interval between times the head passes over different tracks; an interval comparing means for comparing the above interval with a reference interval which is predetermined corresponding to a target speed for a return-to-zero operation; and a target speed modifying means for forcedly modifying the target speed for the use in the operation of the above speed error obtaining means, based on a result of the operation in the interval comparing means, in the return-to-zero operation.

BRIEF DESCRIPTION OF THE DRAWINGS

In the drawings:

FIGS. 3A to 3D are diagrams indicating the above-mentioned predetermined pattern which is written in advance on a rotating memory disc 1, and various paths of the servo head 2 over the pattern;

FIG. 5 is a block diagram indicating the waveforms of two cyclic signals as the position signal Ps;

FIG. 9 is a block diagram indicating an example construction of the speed error detection circuit 14 in FIG. 2;

FIG. 12 is a diagram indicating the timing of the track crossing pulses which are generated in the track crossing pulse circuit 21;

FIGS. 13, 13a and 13b are indicating an operation according to the first aspect of the present invention;

FIGS. 17, 17a and 17b are a flowchart indicating an operation according to the third aspect of the present invention;

Figure 1:
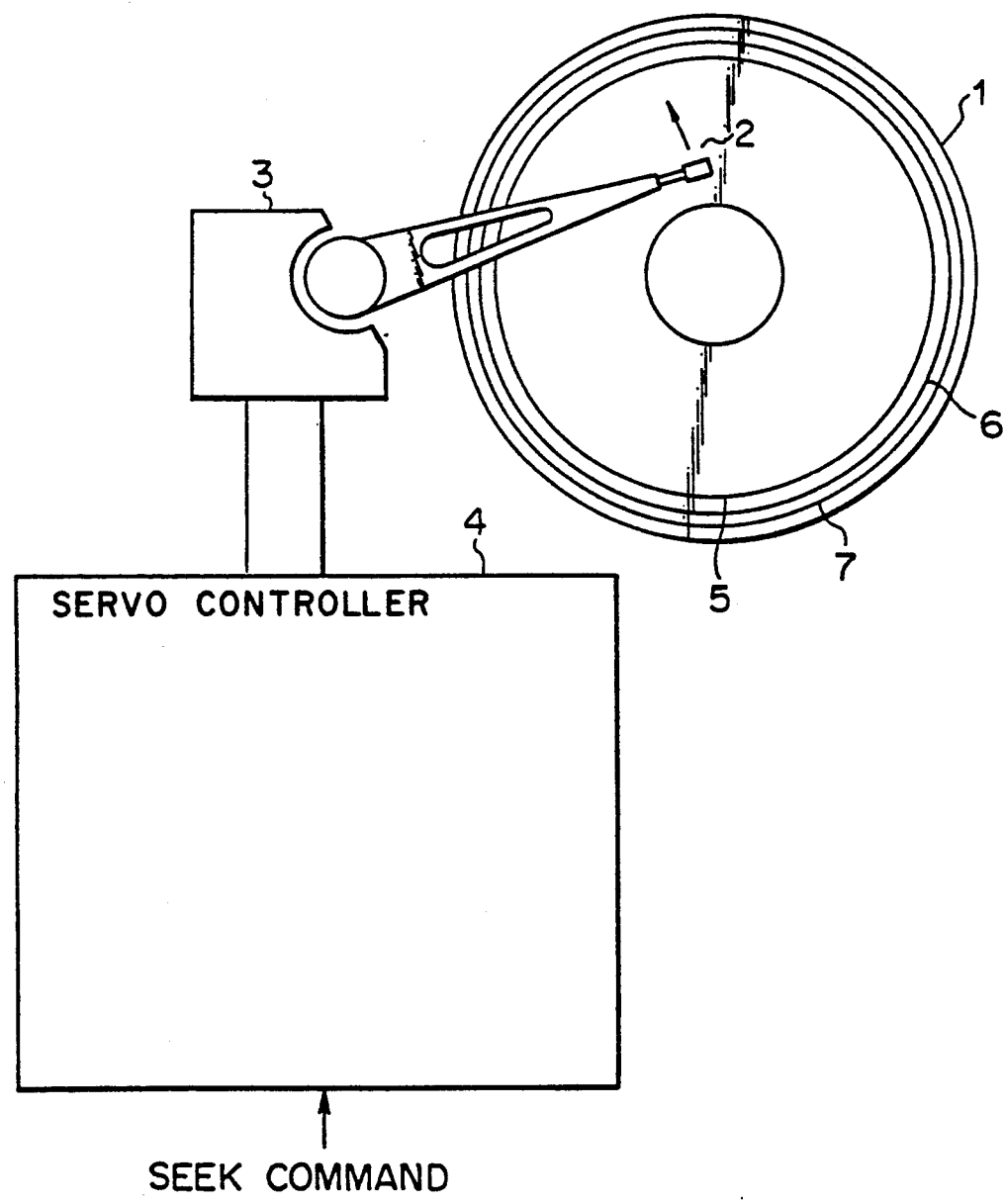
FIG. 1 is a diagram indicating an arrangement of a track access control system in a rotating disc device.

DESCRIPTION OF THE PREFERRED EMBODIMENTS (1) Basic Operations of First, Second, and Third Aspects of the Present Invention Before describing the preferred embodiment of the present invention, first, the basic operations of the various aspects of the present invention are explained below.

Generally, in the first aspect of the present invention, the head is moved by the moving means under the control of the servo control means. In the servo control means, a real speed of the head is detected by the real speed detecting means, a difference between the real speed and a target speed for moving the head is obtained by the speed error obtaining means, and the moving means is controlled by the speed control means so that the head is moved at a speed according to the above difference so that the real speed approaches the target speed. When the head reaches a predetermined vicinity of the target track, the operation is switched from the speed control means to the position control means. That is, thereafter the position control means controls the moving means so that the head is positioned above a target track, using a real position which is detected by the real position detecting means.

In addition to the above, according to the first aspect of the present invention, when the head passes over the above predetermined position, the passing is detected by the timer starting position detecting means, and the timer starts counting time. When a predetermined time is counted before the head reaches the predetermined vicinity, the target speed for the use in the operation of the speed error obtaining means, is increased by the forced target speed increasing means.

Therefore, when the head unintentionally stops before the head reaches the above predetermined vicinity of the target position after passing over the predetermined position, the target speed increasing means increases the target speed when the above predetermined time is counted, so that the head will move again toward the target position.

Generally, in the second aspect of the present invention, the head is moved by the moving means under the control of the servo control means. In the servo control means, a real speed of the head is detected by the real speed detecting means, and the moving means is controlled by the speed control means so that the head is moved to a predetermined vicinity of a target track, using the detected real speed. When the head reaches the predetermined vicinity, the operation is switched from the speed control means to the position control means. That is, thereafter the position control means controls the moving means so that the head is positioned above a target track, using a real position which is detected by the real position detecting means.

In addition to the above, according to the second aspect of the present invention, when the head passes over the above predetermined position, the passing is detected by the timer starting position detecting means, and the timer starts counting time. When a predetermined time is counted before the head reaches the predetermined vicinity, the operation is switched from the speed control means to the position control means.

Therefore, when the head unintentionally stops before the head reaches the above predetermined vicinity of the target position after passing over the predetermined position, the operation is switched from the speed control means to the position control means to position the head.

Generally, in the third aspect of the present invention, the head is moved by the moving means under the control of the servo control means. In the servo control means, a real speed of the head is detected by the real speed detecting means, a difference between the real speed and a target speed for moving the head is obtained by the speed error obtaining means, and the moving means is controlled by the speed control means so that the head is moved at a speed according to the above difference so that the real speed approaches the target speed.

In addition to the above, according to the third aspect of the present invention, in the return-to-zero operation, a time the head passes over each track on the memory disc is detected by the track crossing timing detecting means, an interval between times the head passing over different tracks is detected by the interval detecting means, and the above interval is compared with a reference interval which is predetermined corresponding to a target speed for a return-to-zero operation, by the interval comparing means. Then, the target speed for use in the operation of the above speed error obtaining means is forcedly modified by the target speed modifying means, based on a result of the operation in the interval comparing means, in the return-to-zero operation.

Namely, the real speed is detected by the above-detected interval between the times the head passing over different tracks, in addition to and independently from the detection by the real speed detecting means, and an additional speed control is carried out by modifying the target speed so that the real speed approaches the target speed for the return-to-zero operation. Therefore, even when the speed control means does not operate accurately, for example, due to the speed control means being out of the optimum condition, the real speed is accurately controlled.

(2) Construction of Track Access Control System in an Embodiment of the Present Invention FIG. 1 is a diagram indicating an arrangement of a track access control system in a rotating disc device. In FIG. 1, reference numeral 1 denotes a rotating memory disc (for example, magnetic disc or optical disc), 2 denotes a servo head (for example, magnetic disc or optical head), 3 denotes a head moving mechanism, and 4 denotes a servo controller. On the rotating memory disc 1, 5 denotes a zero track, 6 denotes a first guard zone, and 7 denotes a second guard zone.

The rotating disc device has a plurality of tracks on its surface beginning with the zero track 5, and rotated around an axle by a spindle motor at a constant speed, and digital data can be written on the tracks. The digital data can be read by the servo head 7, and digital data be written on the tracks in a rotating disc device so designed, e.g., a magnetic disc device or an magneto-optical device. The first guard band zone 6 is provided adjacent to and outside of the zero track, and the sec band zone 7 is provided adjacent to and outside the first guard band zone 6, for the return-to-zero operation, which is explained later for the third aspect of the present invention. The head moving mechanism 3 moves the servo head over all the tracks on the rotating memory disc 1. The servo controller 4 controls the movement of the servo head 2 by supplying a driving current to the head moving mechanism 3, based on a command of an amount of movement of the servo head 2, a and position of the servo head 2, as explained below. The general operation of the servo controller 4 is also explained in detail in the U.S. Pat. No. 4,965,501, dated Oct. 23, 1990, granted to the same inventor as the present invention, the U.S. Pat. No. 4,720,754, dated Jan. 19, 1988, granted to Mizoshita et al. and the aforementioned copending application Ser. No. 460, 657. Note that, although, in the following explanation, the rotating disc device is assumed to be a magnetic disc device, the explained features are easily applied to other types of rotating disc devices..

Figure 2:
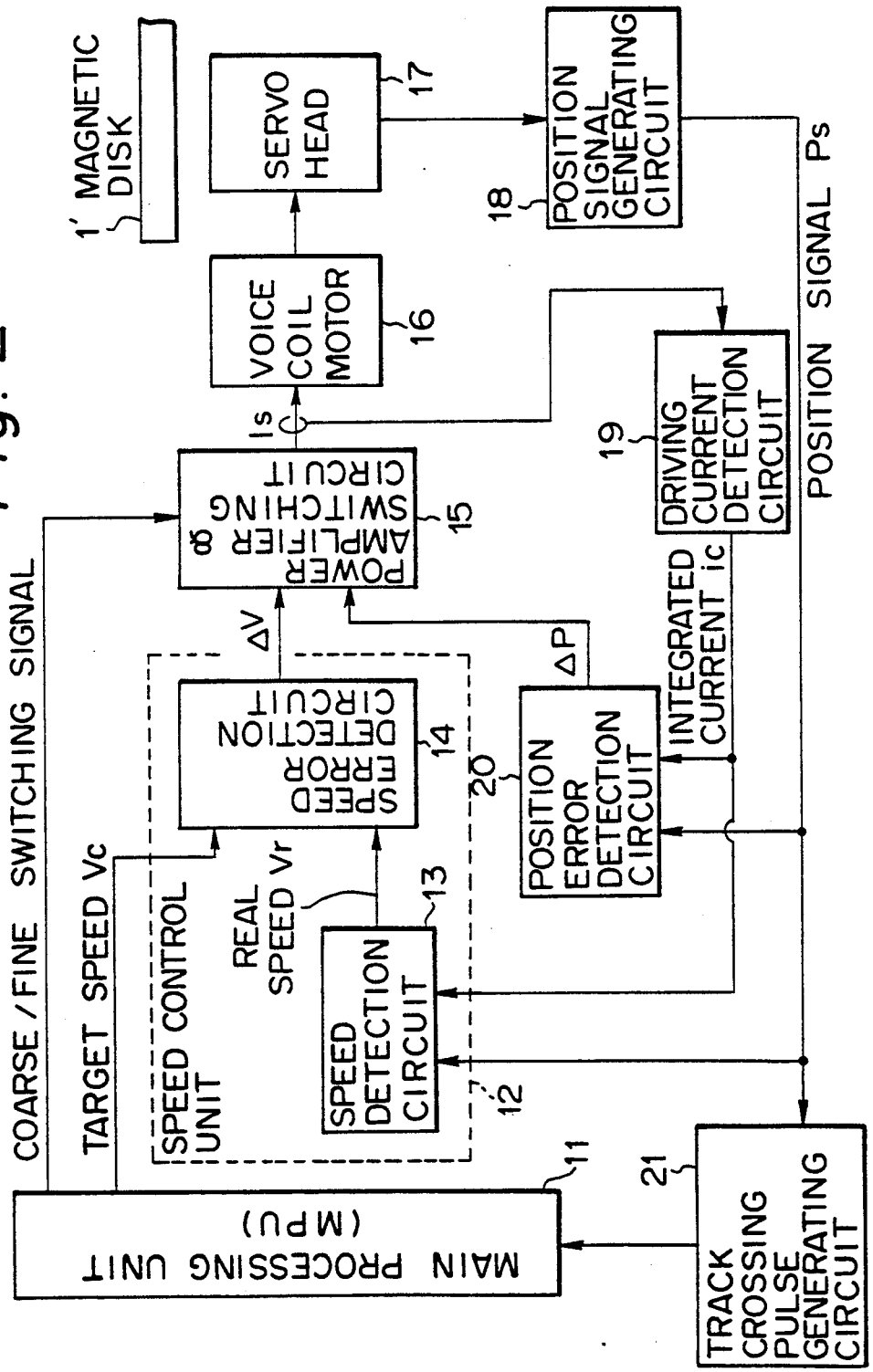
FIG. 2 is a block diagram indicating a construction of the servo controller 4 in an embodiment of the present invention.
Figure 3C:
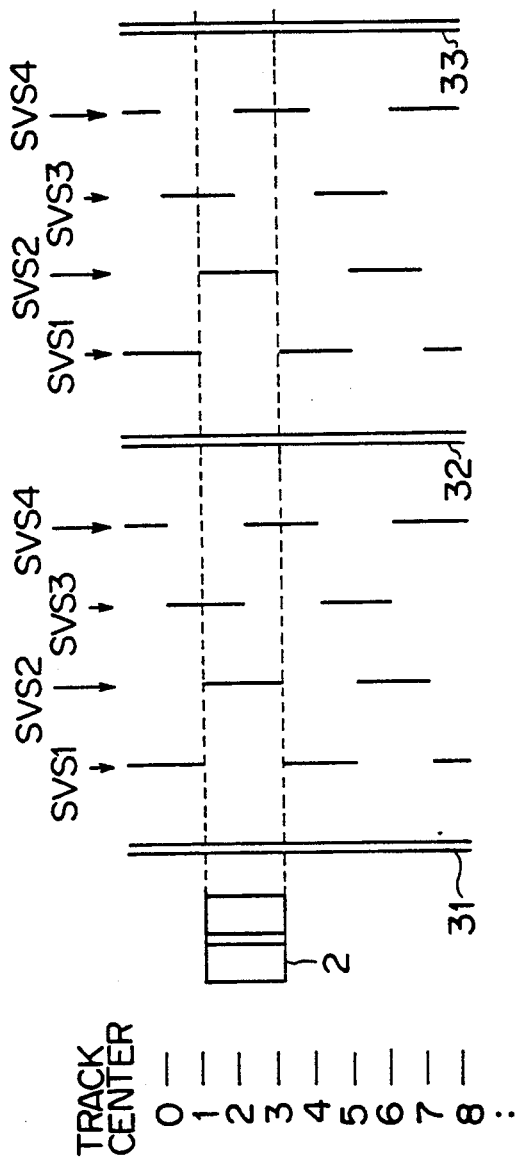
Figure 3D:
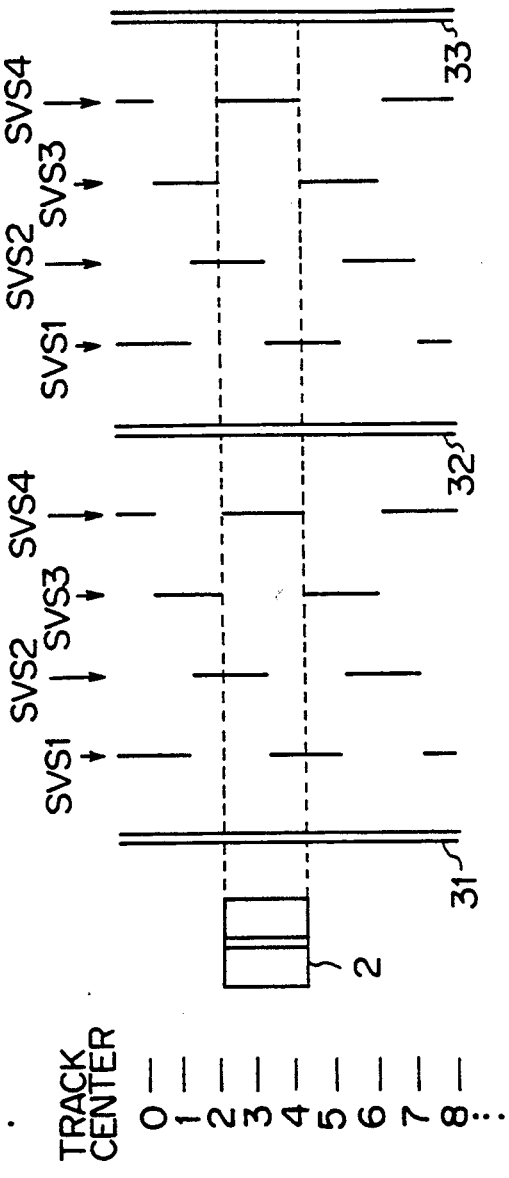
Figure 4A:
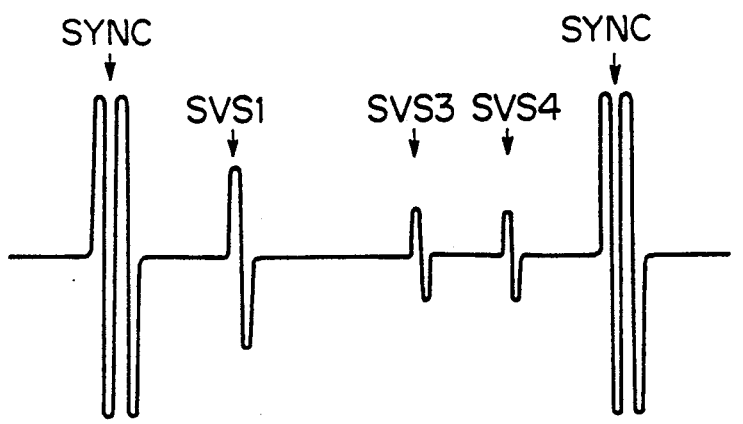
FIGS. 4A to 4D are diagrams indicating waveforms of example signals which are generated in the servo head 2 when sensing the above pattern, as the servo head 2 passes over the pattern on paths at various radii as indicated in FIGS. 3A to 3D.
Figure 4B:
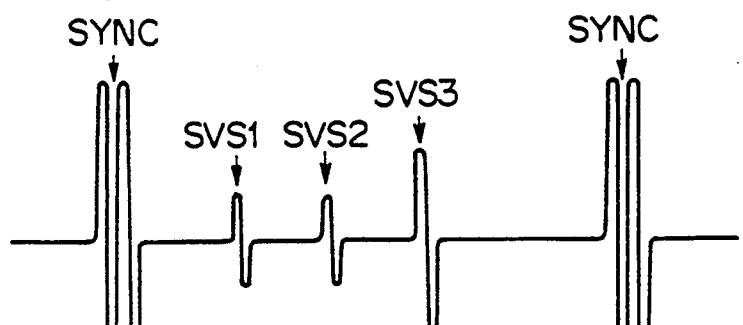
Figure 4C:
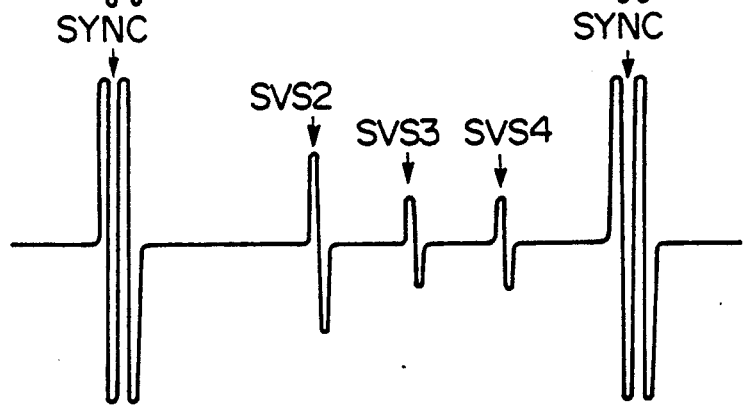
Figure 4D:
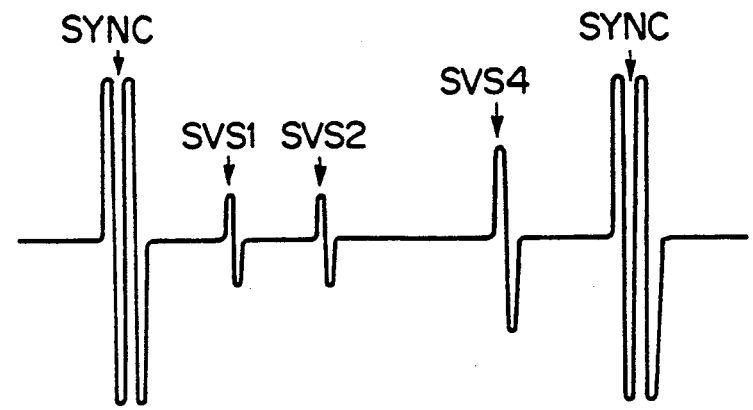

FIG. 2 is a block diagram indicating a construction of the servo controller 4 in an embodiment of the present invention. In FIG. 2, reference numeral 11 denotes a main processing unit, 12 denotes a speed control unit, 13 denotes a speed detection circuit, 14 denotes a speed error detection circuit, 15 denotes a power amplifier & switching circuit, 16 denotes a voice coil motor, 18 denotes a position signal generating circuit, 19 denotes a driving current detection circuit,. 20 denotes a position error detection circuit, and 21 denotes a track crossing pulse generating circuit.

The voice coil motor 16 receives a driving current Is from the power amplifier & switching circuit 15, and drives the above head moving mechanism 3 to move the servo head 2.

The position signal generating circuit 18 generates a position signal Ps from a signal which is output from the servo head 2 as a result of reading a predetermined pattern which is written on the rotating memory disc 1. The predetermined pattern is written on the rotating memory disc 1 for generating the above position signal, as explained later.

The current detection circuit 19 detects the driving current Is of the voice coil motor 16, and integrates the detected current Ic to generate an integrated current signal ic. The integrated current signal ic is supplied to the speed detection circuit 13 and the position error detection circuit 20. Since the driving current Ic is proportional to an acceleration of the servo head 2, the integrated current signal ic is regarded to be proportional to the speed of the servo head 2.

The speed detection circuit 13 detects a real speed Vr of the servo head 2 based on the above position signal Ps and the integrated current signal ic, as explained later. The speed error detection circuit 14 obtains a difference between the above-mentioned target speed Tc and the above real speed Vr to generate a speed error signal $\Delta V$, where the target speed Tc is supplied thereto from the main processing unit 11. The speed error signal $\Delta V$ is supplied to the power amplifier & switching circuit 15.

The position error detection circuit 20 generates a position error signal $\Delta P$ based on the above position signal Ps and the integrated current signal ic, is explained later. The position difference signal $\Delta P$ is supplied to the power amplifier & switching circuit 15.

The power amplifier & switching circuit 15 has a switch and power amplifier, receives the above speed error signal $\Delta V$ and the position error signal $\Delta P$, selects the speed error signal $\Delta V$ or the position error signal $\Delta P$ according to whether a coarse/fine switching signal from the main processing unit 11 indicates a coarse control mode or a fine control mode, respectively, and amplifies the selected error signal to generate and supply the driving current Is to the voice coil motor 16.

The track crossing pulse generating circuit 21 generates a track crossing pulse based on the above position signal Ps as explained later.

The main processing unit 11 is constituted by a microprocessor, and controls all operations of the servo controller 4. In particular, the main processing unit 11 generates the above-mentioned target speed Tc in accordance with an amount of movement of the servo head 2 which is supplied to the servo controller 4, for example, from a host processor (not shown which monitors the position of the servo head 2 by the above track crossing pulse, and changes the indication of the above coarse/fine switching signal based on whether or not the servo head 2 reaches a predetermined vicinity of a target position of the servo head 2, as explained later. In addition, the main processing unit 11 supplies necessary parameters to adjust the offsets and gains in the speed detection unit 13, the speed error detection circuit 14, the position control unit 20, and the position signal generating circuit 18, etc. as explained later.

The above mentioned predetermined pattern which are written in advance on a rotating memory disc 1, is indicated in FIGS. 3A to 3D. In FIGS. 3A to 3D, 2 denotes a servo head, and 31, 32, and 33 each denote a synchronization pattern. The same pattern is shown in FIGS. 3A to 3D, but the position of the servo head is different in each figure as shown therein. In FIGS. 3A to 3D, line segments each having a length equal to twice the width of a track (which is the width of the servo head (writing head) 2), and cyclically appearing under denotations SVS1, SVS2, SVS3, and SVS4, respectively, in the direction perpendicular to the tracks, indicate the above predetermined pattern. The state of the (magnetic) medium on each track is inverted in each line segment. The pattern shown in FIGS. 3A to 3D repeats at a rate of every fourth track in the direction perpendicular to the tracks.

FIGS. 4A to 4D are diagrams indicating waveforms of example signals which are generated in the servo head 2 responding at a sensing at the above pattern, when the servo head 2 passes over the above pattern on paths at various radii as respectively indicated by dashed lines in FIGS. 3A to 3D. As shown in FIGS. 4A to 4D, the waveforms have a peak at each of the above line segments under the denotation SVSi (i=1, 2, 3, and 4), and the height of the peak is higher when the overlapping length between the servo head 2 and the corresponding line segment is longer.

In this embodiment, the above position signal Ps is a two-phase cyclic signal as indicated in FIG. 5. That is, the position signal Ps is comprised of two cyclic signals N and Q where the phase of one cyclic signal is different by 90 degrees from the other, and the cycles (360 degrees) of the cyclic signals N and Q correspond to movement of the servo head 2 over the width of four tracks. The above predetermined pattern on the magnetic memory disc 1 is so arranged that one signal N of the above cyclic signals is obtained as a difference between the heights of the peaks corresponding to the line segments under the denotations SVS1 and SVS2, and the other signal Q is obtained as a difference between the heights of the peaks corresponding to the line segments under the denotations SVS3 and SVS4. Since the cycle of the position signal Ps corresponds to four tracks, the position of the servo head 2 within any range corresponding to the width of four tracks can be recognized from the phase of the position signal Ps. In addition, inclined portions and flat portions cyclically appear in the above cyclic signals N and Q, and the real speed of the servo head 2 can be recognized by the inclination of the inclined portions, as explained later.

Figure 6:
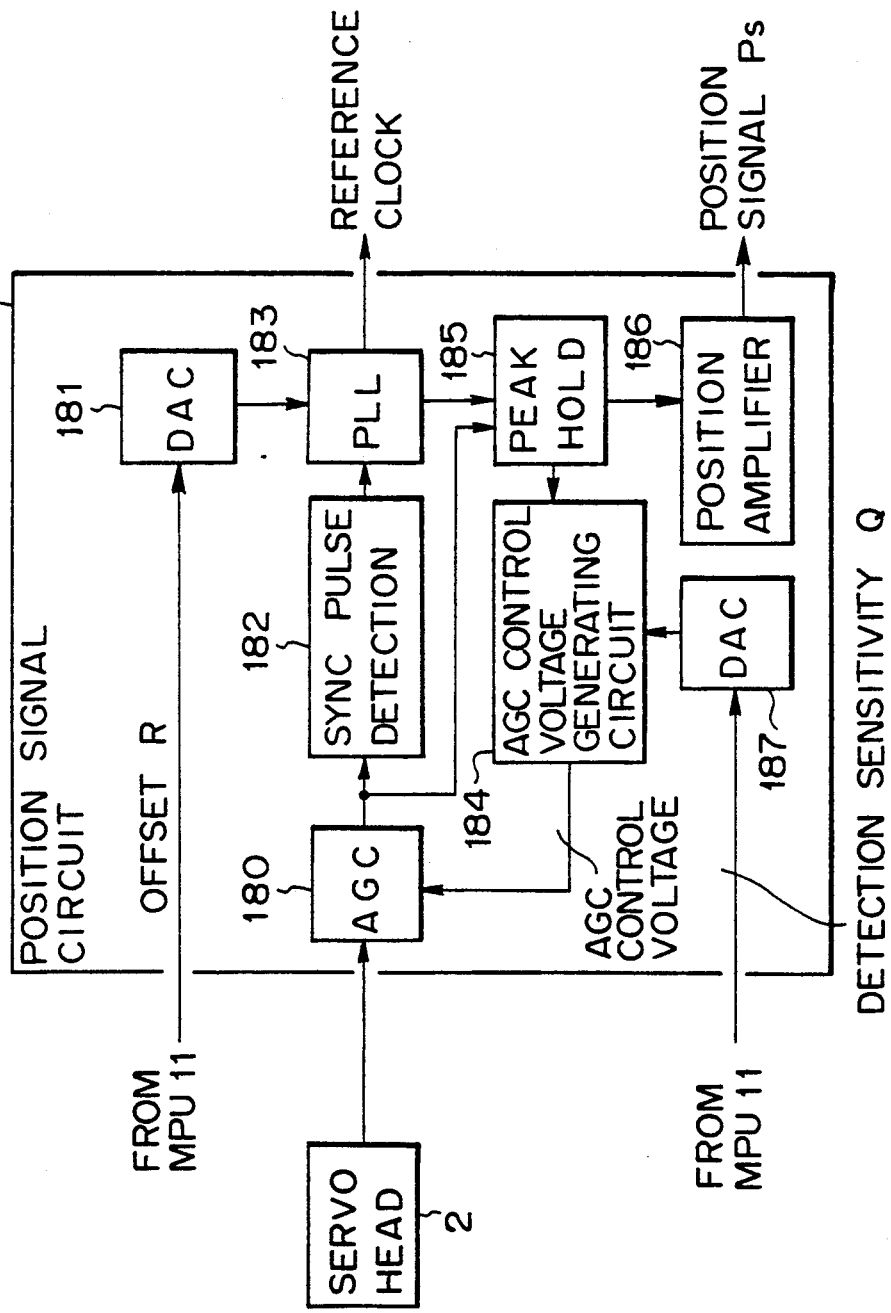
FIG. 6 is a block diagram indicating an example construction of the position signal generating circuit 18 of FIG. 2, for generating the position signal Ps.

FIG. 6 is a block diagram indicating an example construction of the position signal generating circuit 18 of FIG. 2, for generating the above position signal Ps. In FIG. 6, reference numeral 180 denotes an automatic gain control (AGC) circuit, 181 denotes a digital to analog converter, 182 denotes a synchronization pulse detection circuit, 183 denotes a PLL circuit, 184 denotes an AGC control voltage generating circuit, 185 denotes a peak hold circuit, 186 denotes a position amplifier, and 187 denotes a digital to analog converter.

The above signal which is generated in the servo head 2 responding to a sensing of a state of a portion above which the servo head 2 is located, is applied to the synchronization pulse detection circuit 182 and the peak hold circuit 185 through the AGC circuit 180. When the servo head 2 senses the above-mentioned synchronization patterns 31, 32, and 33 shown in FIGS. 3A to 3D, the synchronization pulse detection circuit 182 outputs a timing pulse to the PLL circuit 183. The PLL circuit 183 generates a reference clock for sampling the above peaks corresponding to the above line segments under the denotations SVS1, SVS2, SVS3, and SVS4. The reference clock is supplied to the peak hold circuit 185. Receiving the reference clock, the peak hold circuit 185 holds the pulse heights of the above peaks corresponding to the portions SVS1, SVS2, SVS3, and SVS4. These values of the peak heights are supplied to the position amplifier 186, and the position amplifier 186 generates the above position signal Ps of FIG. 5 from the peak heights. The AGC control voltage generating circuit 184 generates an AGC control voltage based on the above peak heights which are held in the peak hold circuit 185, and the AGC control voltage controls the AGC circuit 180 so that the output level of the AGC circuit 180 is maintained constant. The digital to analog converter 181 is provided for adjusting the timing of the reference clock from the main processing unit 11 of FIG. 2, and the digital to analog converter 187 is provided for adjusting the output level of the AGC control voltage generating circuit 184.

Figure 7:
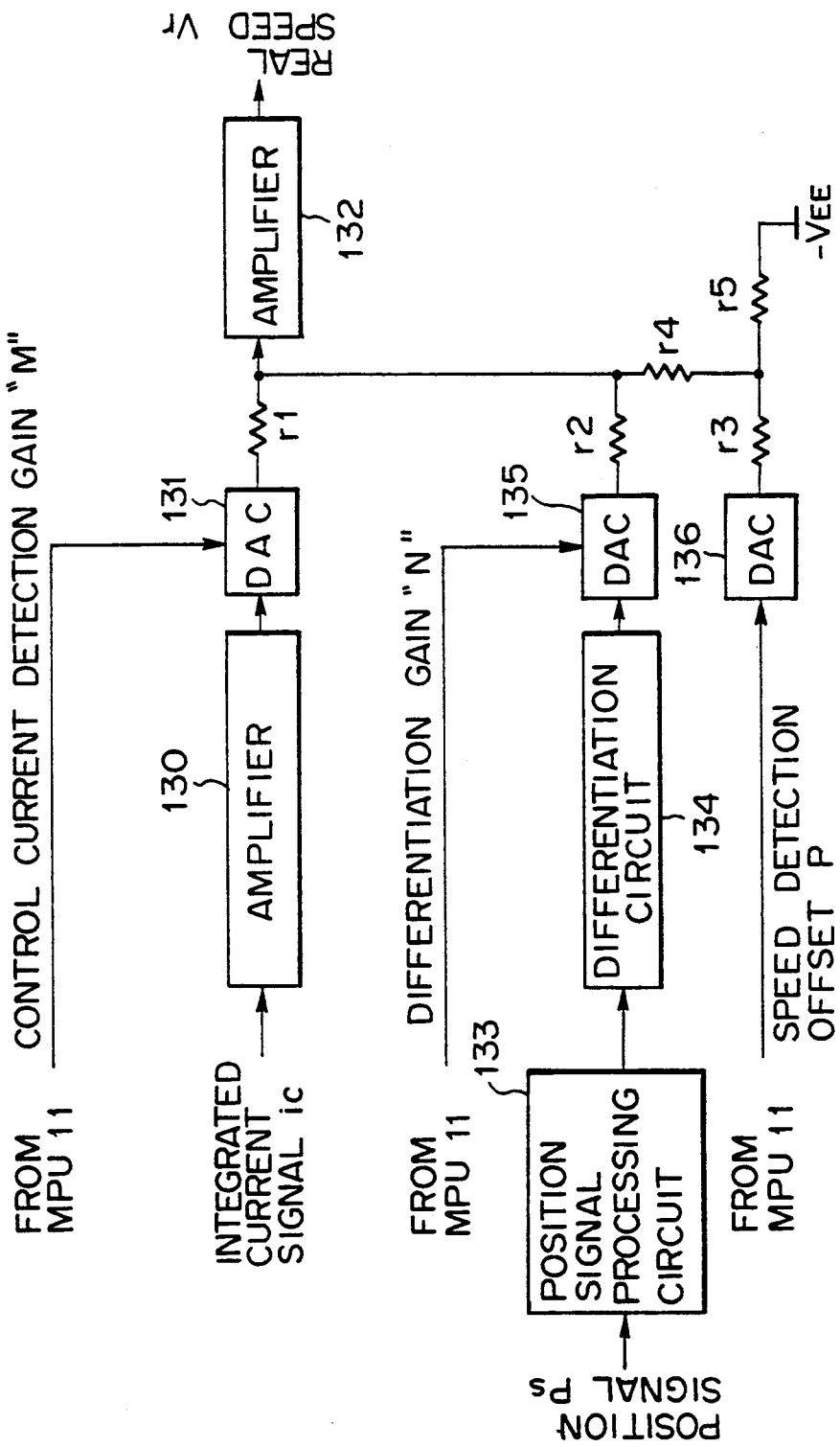
FIG. 7 is a block diagram indicating an example construction of the speed detecting circuit 13 in FIG. 2.

FIG. 7 is a block diagram indicating an example construction of the speed detection circuit 13 in FIG. 2. In FIG. 7, reference numerals 130 and 132 each denote an amplifier, 131 and 135 denote multiplication-type digital to analog converters, and 136 denotes a digital to analog converter, 133 denotes a position signal processing circuit, and 134 denotes a differentiation circuit.

The aforementioned integrated current signal ic from the driving current detection circuit 19 is amplified in the amplifier 130, where as mentioned before, the integrated current signal ic is considered to be proportional to the real speed of the servo head 2.

The position signal processing circuit 133 receives the position signal Ps from the position signal generating circuit 18, and extracts the above-mentioned inclined portions of the position signal Ps as follows. First, an inversion $-Q$ of the above cyclic signal Q is generated as indicated by a dashed line in FIG. 8. Next, the levels of the signals N and Q, and N and $-Q$ are respectively compared by comparators (not shown). Then, the signal Q is selected as the output of the position signal processing circuit 133 when $N>Q$ and $N>-Q$; the inversion $-N$ of the signal N is selected as the output when $N<Q$ and $N>-Q$; the inversion $-Q$ of the signal Q is selected as the output when $N<Q$ and $N<-Q$; and the signal N is selected as the output when $N>Q$ and $N<-Q$. The output of the position signal processing circuit 133 is differentiated in the differentiation circuit 134.

The output levels of the above amplifier 130 and the differentiation circuit 134 are respectively modified by the multiplication-type digital to analog converters 131 and 135, and the outputs of the multiplication-type digital to analog converters 131 and 135 are wired-OR connected through the resistors r1 and r2 to be input into the amplifier 132. The gains in the multiplication-type digital to analog converters 131 and 135 are respectively adjusted by digital control inputs M and N applied thereto from the main processing unit 11. In addition, a digital value P for a speed detection offset is converted into an analog value by the digital to analog converter 136. The output of the digital to analog converter 136 is connected through a voltage divider which is comprised of resistors r3 and r5, and a resistor r4, to the above wired-OR connection to adjust an offset in the input level of the amplifier 132. The output of the amplifier 132 provides the real speed Vr.

FIG. 9 is a block diagram indicating an example construction of the speed error detection circuit 14 in FIG. 2. In FIG. 9, reference numeral 140 denotes a speed error generating circuit, 141 denotes a target speed analog voltage generating circuit, 142 denotes a target speed generating DAC, 143 and 145 each denote a digital to analog converter, and 144 and 146 each denote an analog to digital converter. The target speed generating DAC 142 receives a digital value of the target speed Vc from the main processing unit 11 in FIG. 2, and outputs an analog voltage proportional to the target speed Vc, where the output gain in the target speed generating DAC 142 is monitored by the main processing unit 11 through the analog to digital converter 144, and the output gain in the target speed generating DAC 142 is adjusted from the main processing unit 11 through the digital to analog converter 143. The output of the target speed generating DAC 142 is amplified in the target speed analog voltage generating circuit 141 to generate an analog voltage corresponding to the target speed Vc, where the polarity of the output voltage is determined based on a FORWARD/REVERSE/OFF signal from the main processing unit 11. That is, the polarity of the output voltage is plus when the FORWARD/REVERSE/OFF signal indicates "FORWARD", or is minus when the FORWARD/REVERSE/OFF signal indicates "REVERSE". The digital to analog converter 145 is provided for adjusting an offset of the output voltage of the target speed analog voltage generating circuit 141 from the main processing unit 11. The output voltage of the target speed analog voltage generating circuit 141 is monitored by the main processing unit 11 through the analog to digital converter 146. The speed error generating circuit 140 receives the output of the speed detection circuit 13 and the output of the target speed analog voltage generating circuit 141, and obtains a difference between the received outputs as the speed error detection signal $\Delta V$.

Figure 10:
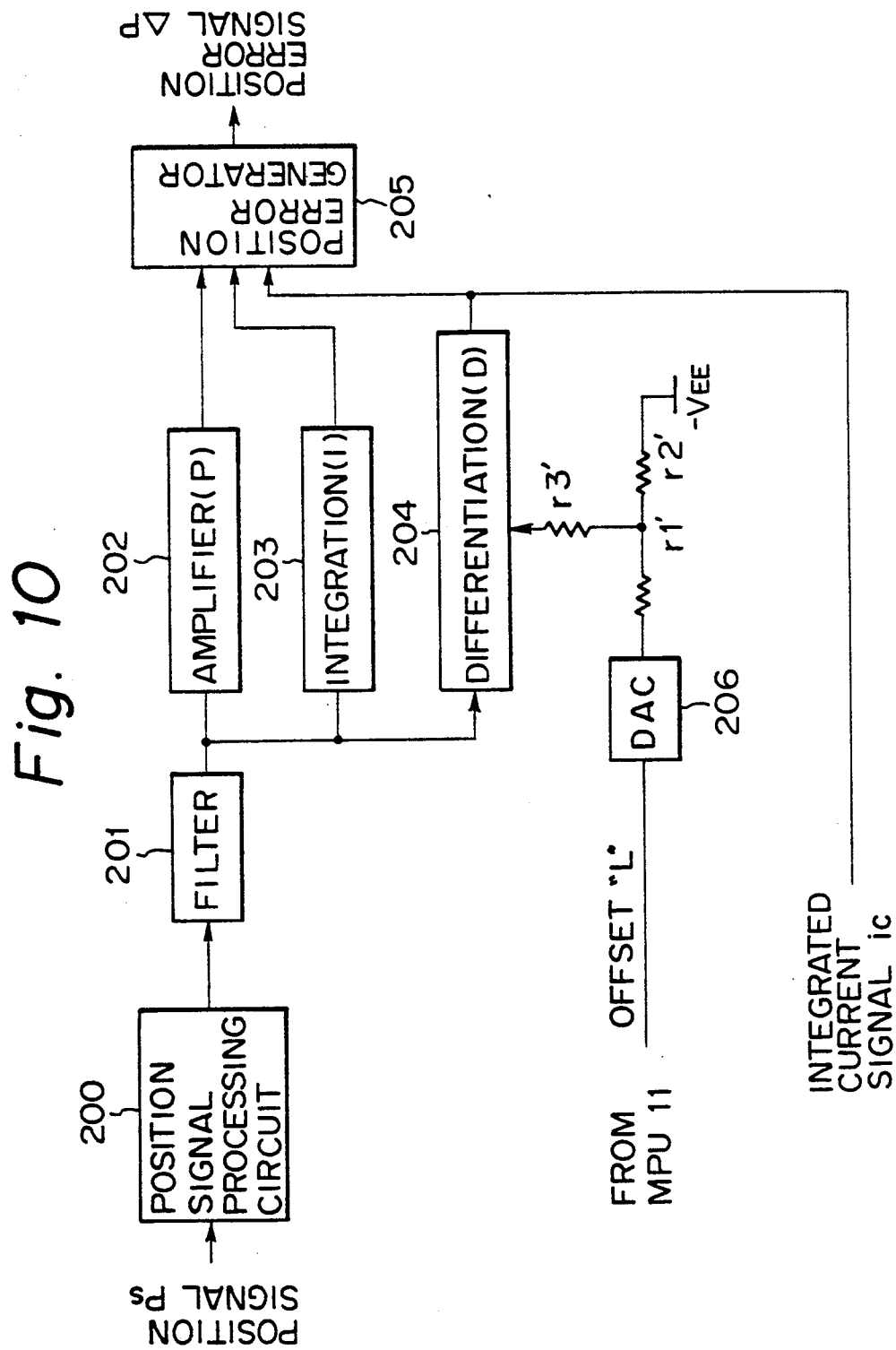
FIG. 10 is a block diagram indicating an example construction of the position error detection circuit 20 in FIG. 2.

FIG. 10 is a block diagram indicating an example construction of the position error detection circuit 20 in FIG. 2. In FIG. 10, reference numeral 200 denotes a position signal processing circuit, 201 denotes a filter circuit, 202 denotes a proportional amplifier, 203 denotes an integration circuit, 204 denotes a differentiation circuit, 205 denotes a position error generator, and 206 denotes a digital to analog converter.

Figure 11:
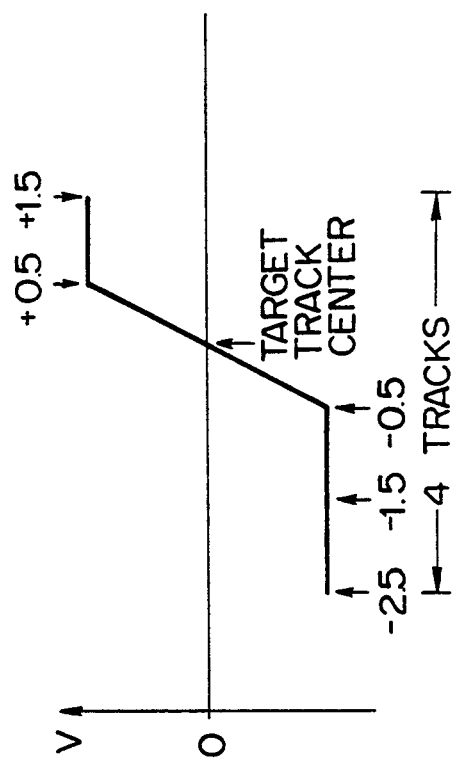
FIG. 11 is an input-output characteristic of the position signal processing circuit 200 in the position error detection circuit 20 in FIG. 2.

The position signal processing circuit 200 receives the position signal Ps from the position signal generating circuit 18 and information on a target track center from the main processing unit 11, and the input-output characteristic of the position signal processing circuit 200 is basically as shown in FIG. 11. The characteristic of FIG. 11 is obtained as follows.

Figure 8:
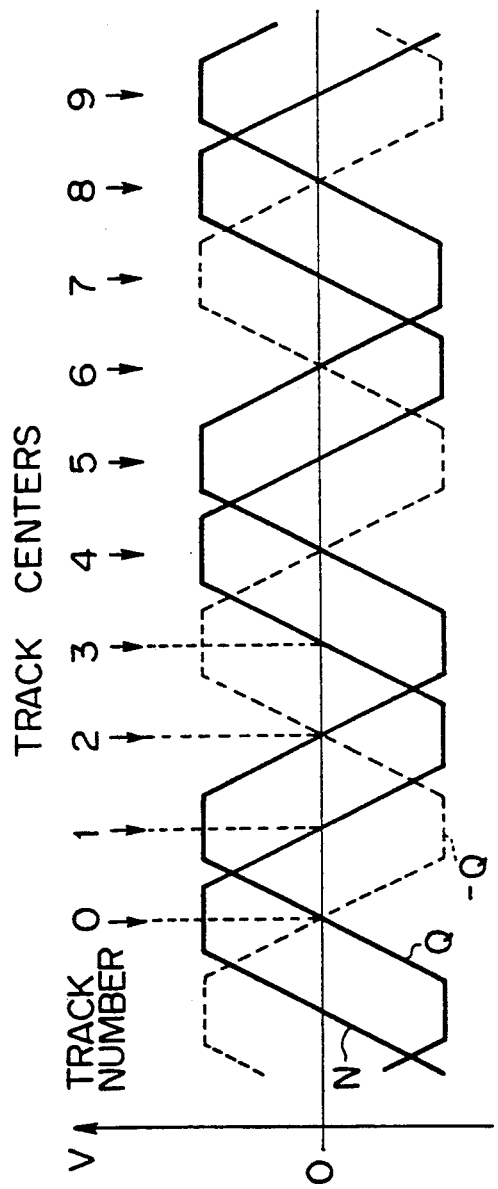
FIG. 8 is a diagram indicating waveforms of the two cyclic signals N and Q of the position signal Ps, and the inversion −Q of the signal Q.

First, the inversion $-Q$ of the above cyclic signal Q is generated as indicated by a dashed line in FIG. 8. Next, the levels of the signals N and Q, and N and $-Q$ at the target track center are respectively obtained by comparators (not shown). Then, the signal Q is selected for the input range $-0.5$ track to $+0.5$ track from the target track center when $N>Q$ and $N>-Q$; the inversion $-N$ of the signal N is selected for the same input range when $N<Q$ and $N>-Q$; the inversion $-Q$ of the signal Q is selected for the same input range when $N<Q$ and $N<-Q$; and the signal N is selected for the same input range when $N>Q$ and $N<-Q$. The output of the position signal processing circuit 133 is fixed to a positive constant for the input range over $+0.5$ track to $+1.5$ track from the target track center, and to a negative constant for the input range over $-2.5$ track to $-0.5$ track from the target track center. The input range is detected by the above comparison between the levels of the signals N and Q, and N and −Q.

The output of the position signal processing circuit 200 is filtered in the filter circuit 201 to eliminate noise, and the output of the filter circuit 201 is applied in parallel to the proportional amplifier 202, the integrator 203, and the differentiation circuit 204, and the outputs of the proportional amplifier 202, the integrator 203, and the differentiation circuit 204, and the integrated current signal ic are summed in the position error generator 204 to carry out a so-called PID (proportional-integration-differentiation) control to compensate a phase deviation in the output of the position signal processing circuit 200 and obtain the position error signal ΔP. In addition, the integrated current signal ic is wired-OR connected to the output of the differentiation circuit 204. An offset in the differentiation circuit 204 is adjusted by a construction which is comprised of the digital to analog converter 206 and resistors r1', r2', and r3'. A digital value L for adjusting the offset is input into the digital to analog converter 206, the output of the digital to analog converter 206 is applied to the differentiation circuit 204 through a voltage divider which is comprised of the resistors r1' and r2', and the resistor r3'.

FIG. 12 is a diagram indicating the timing of the track crossing pulses which are generated in the track crossing pulse generating circuit 21. As shown in FIG. 12, the track crossing pulses are generated so that a track crossing pulse rises when the curve of the above-mentioned cyclic signal N intersects with the curves of the cyclic signals Q and −Q. These intersection times can be detected by comparators (not shown) for comparing the above cyclic signals N and Q, and comparing cyclic signals N and −Q. As shown in FIG. 12, in this embodiment, each track crossing pulses rises at a middle position between a pair of track centers adjacent to each other. The track crossing pulses rise, for example, at the positions of −1.5 and −0.5 track widths before a target track center, and +0.5 and +1.5 track widths after the target track center, . . . .

Figure 13A:
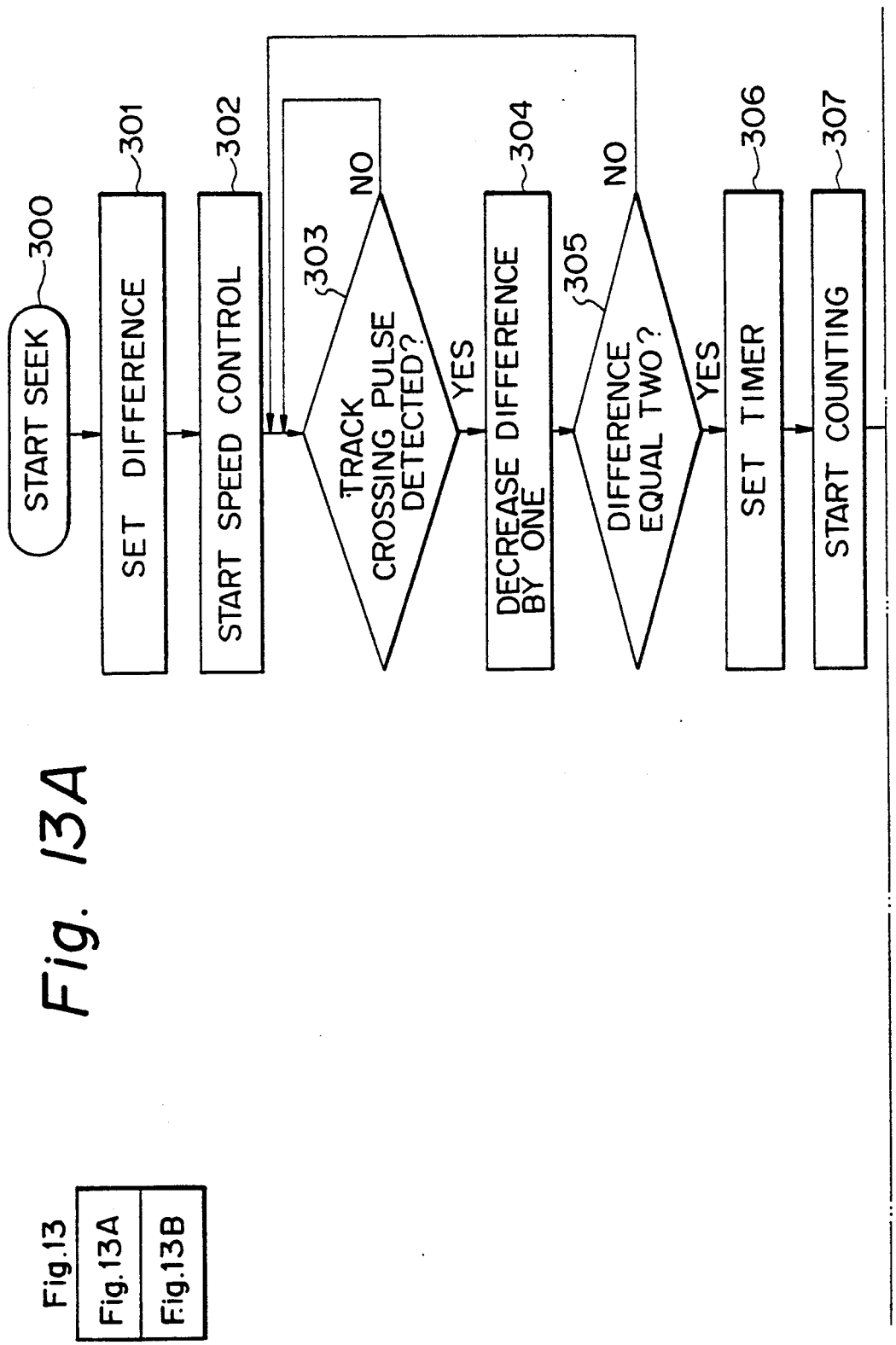
Figure 13B:
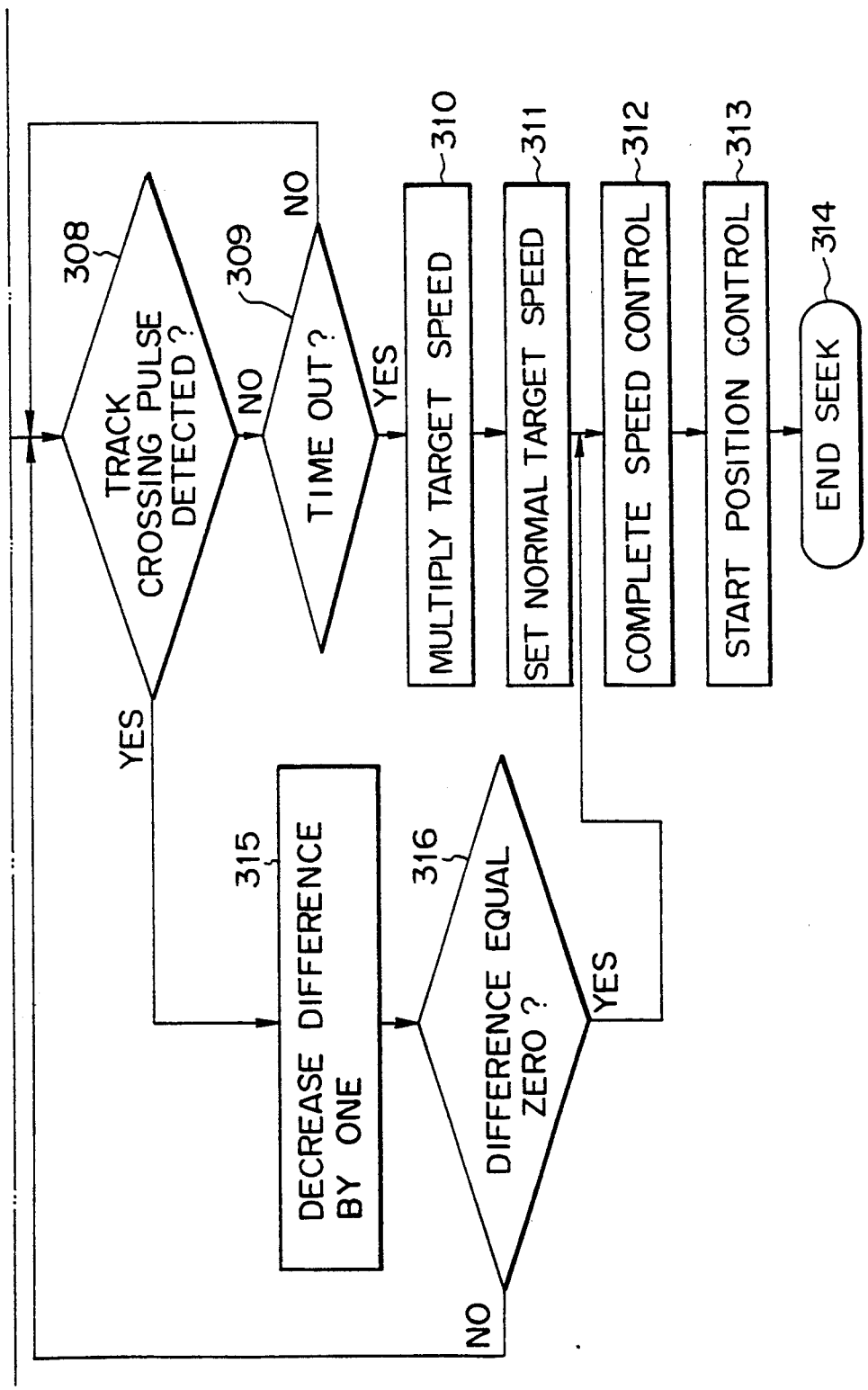

(3) Characteristic Functions in an Embodiment of the First Aspect of the Present Invention FIG. 13 is a flowchart indicating an operation according to the first aspect of the present invention.

In the step 300, the seek operation (track access operation) starts. In the step 301, a difference value (which is supplied to the servo controller 4 as a seek command as explained before) is set in a register (not shown) in the main processing unit 11. In the step 302, the main processing unit 11 starts a speed control operation. Namely, the main processing unit 11 outputs the coarse/fine switching signal in the speed control mode, determines the aforementioned target speed Vc and the mode of the FORWARD/REVERSE/OFF signal according to the difference, and outputs the target speed Vc and the FORWARD/REVERSE/OFF signal to the speed error detection circuit 15. When a track crossing pulse is detected in the step 303, the difference value is decreased by one in the step 304. In the step 305, it is determined whether or not the difference value is equal to two. When it is determined that the difference value is not equal to two, the operation goes back to the step 303. As understood from FIG. 12, when the difference value is equal to two, the servo head is between the position of 2.5 track widths before the target position and the position of 1.5 track widths before the target position. Although not shown, the main processing unit 11 comprises a timer. When it is determined that the difference value is equal to two, the operation goes back to the step 306 to set a predetermined time in the timer, and the main processing unit 11 starts counting time in the main processing unit 11 in the step 307. Then, when a track crossing pulse is detected in the step 308, the operation goes to the step 315, and the difference value is decreased by one. In the step 316, it is determined whether or not the difference value is equal to zero. As understood from FIG. 12, when the difference value is equal to zero, the servo head has passed the position of 0.5 track width before the target position. When it is determined that the difference value is not equal to zero, the operation goes back to the step 308. When it is determined that the difference value is equal to zero, the operation goes back to the step 312 to complete the speed control. Then, the main processing unit 11 starts the position control in the step 313. As explained before with reference to FIG. 11, when the servo head is in the range from −2.5 track widths before the target track center to +1.5 track widths past the target track center, the servo head can be lead to the target track center by the position control when the main processing unit 11 carries out the position control, in this embodiment. When the servo head 2 is positioned at the desired target center by the position control, the seek operation is completed in the step 314.

When time out is detected by the timer in the step 309, the operation goes to the step 310 to multiply the above target speed Vc by a predetermined factor which is greater than one. The speed control using the increased target speed is carried out for a predetermined time. After the predetermined time (for example, one millisecond) elapses, in the step 311, the value of the target speed Vc is returned to a normal value, and the operation goes to the step 312 to complete the speed control. Then, the main processing unit 11 starts the position control in the step 313. When the servo head 2 is positioned at the desired target center by the position control, the seek operation is completed in the step 314.

Figure 14:
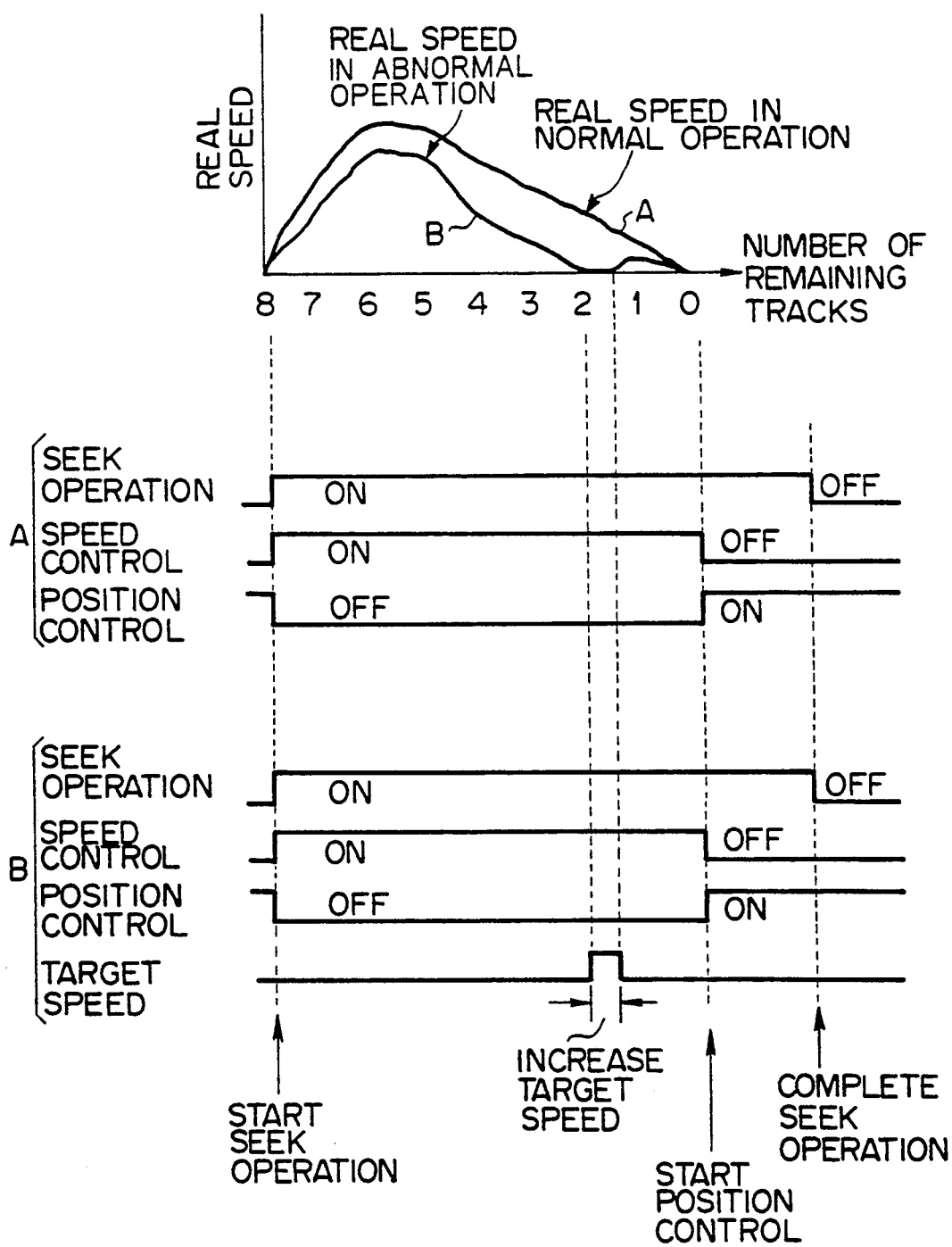
FIG. 14 is a diagram indicating example timing of the operation of FIG. 13.

FIG. 14 is a diagram indicating example timings of the operations of FIG. 13 for the case where the servo head 2 moves normally (which is indicated by "A"), and in the case when the servo head 2 unintentionally stops before the operation is switched to the position control (which is indicated by "B"). In the upper portion of the FIG. 14, example curves of the real speeds of the servo head for the cases A and B are shown. Normally, the real speed increases just after a start of a speed control operation, decreases as the servo head comes near the target position, and then becomes near zero when the servo head passes over the position of 0.5 track width before the target track. However, the servo head may unintentionally stop before the operation is switched to the position control when the speed control system is not in the optimum condition.

As shown in FIG. 14, when, the servo head 2 moves normally, the timing of the operation is the same as the operation without the steps 306, 307, and 309 to 311. When the servo head 2 unintentionally stops before the operation is switched to the position control, this stop is detected as the above time out in the step 309, and the target speed is increased for a predetermined time for "pushing" the servo head into the range wherein the position control operates. Thereby the real speed of the servo head is increased as shown in FIG. 14, so that the servo head 2 is moved in the range wherein the servo head 2 is positioned to the desired (target) position by the position control.

Some modifications may be made of the above operation of FIG. 13, as follows.

(a) After the step 311 in the flowchart of FIG. 13, additional steps for waiting a predetermined time, and for determining whether or not a track crossing pulse is detected, may be inserted. In this case, when YES is determined, the operation goes to the step 315. Or, when NO is determined, the operation goes to the step 310. That is, it can be determined whether or not the next track crossing pulse is detected in the step 308, and, if it is determined that the previous "pushing" has not been enough to move the servo head, another "pushing" operation can be performed in the step 310. Namely, it can be determined whether or not a "pushing" which has been previously carried out has been enough to move the servo head, and the "pushing" can be repeated until the servo head reaches the position at which the control is switched from the speed control to the position control.

Further, in this case, the above predetermined factor may be increased after a failure of a previous "pushing".

(b) The above predetermined time for which the above increased target speed may be in effect, may be determined according to the above difference value (the remaining number of tracks to the target track). Namely, when the difference value is larger, the increased target speed is in effect for a longer rime, instead of the above multiplication of the predetermined factor.

(c) The increase of the target speed may be carried out in other ways. For example, a predetermined value may be added to the normal target value.

(d) The range of FIG. 11 may be changed as long as the total width is equal to four tracks, and the range from −0.5 track width to +0.5 track widths is included therein.

Figure 15:
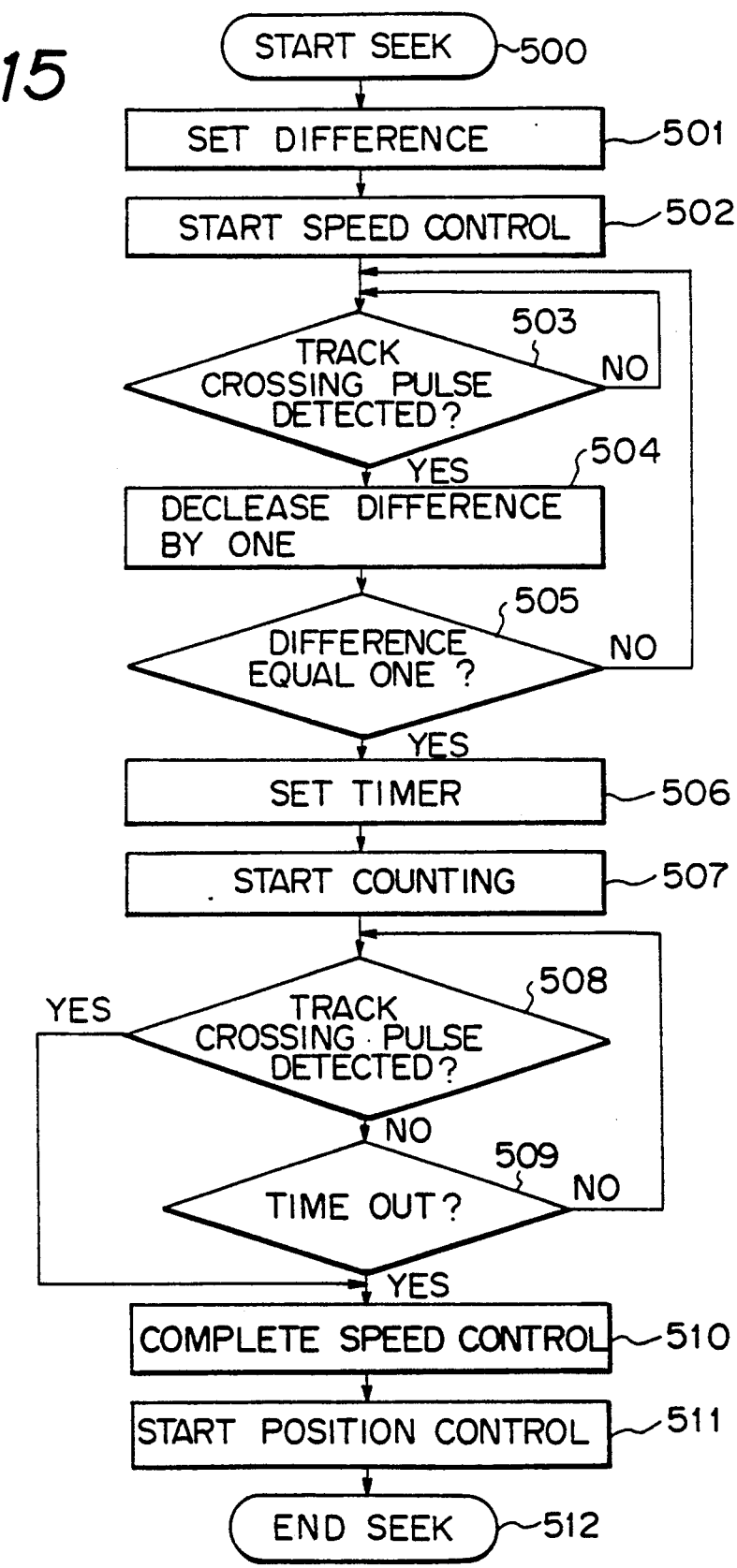
FIG. 15 is a flowchart indicating an operation according to the second aspect of the present invention.

(4) Characteristic Functions in an Embodiment of the Second Aspect of the Present Invention FIG. 15 is a flowchart indicating an operation according to the second aspect of the present invention.

In the operation of FIG. 15, the operation in the steps 500 to 507 is the same as the operation in the steps 300 to 307 in FIG. 13, except that, in the step 505, it is determined whether or not the difference value is equal to one instead of two. As understood from FIG. 12, when the difference value is equal to one, the servo head is between the position of 1.5 track widths before the target position and the position of 0.5 track width before the target position.

Then, in the step 508, it is determined whether or not the next track crossing pulse is detected. When a track crossing pulse is detected in the step 508, the operation goes to the step 510 to complete the speed control, because the detection of the track crossing pulse indicates that the servo head 2 has passed over the position of 0.5 track width before the target track. Then, the main processing unit 11 starts the position control in the step 313 to position the servo head 2 to the desired (target) position.

When a track crossing pulse is not detected in the step 508, the operation goes to the step 509 to determine whether or not a predetermined time has elapsed from the time the timer starts. When it is determined that the predetermined time has elapsed in the step 509, the operation goes to the step 510 to complete the speed control. Then, the main processing unit 11 starts the position control in the step 313 to position the servo head 2 to the desired (target) position.

When it is determined that the predetermined time has not elapsed yet in the step 509, the operation goes back to the step 508 to determine again whether or not the next track crossing pulse is detected. When it is determined that the predetermined time has elapsed in the step 509, the operation goes to the step 510 and then to the step 511 to complete the speed control and start the position control. As explained before, when the servo head is in the range from −2.5 track before the target track center to +1.5 tracks past the target track center, the servo head can be lead to the target track center by the position control when the main processing unit 11 carries out the position control, in this embodiment.

Since the range wherein the position control is effectively carried out for positioning the servo head is determined as above, the position where the timer starts must be set within that range, or the servo head will be lead to a wrong track center which is apart from the desired track center by 4n tracks, where n is an integer.

Figure 16:
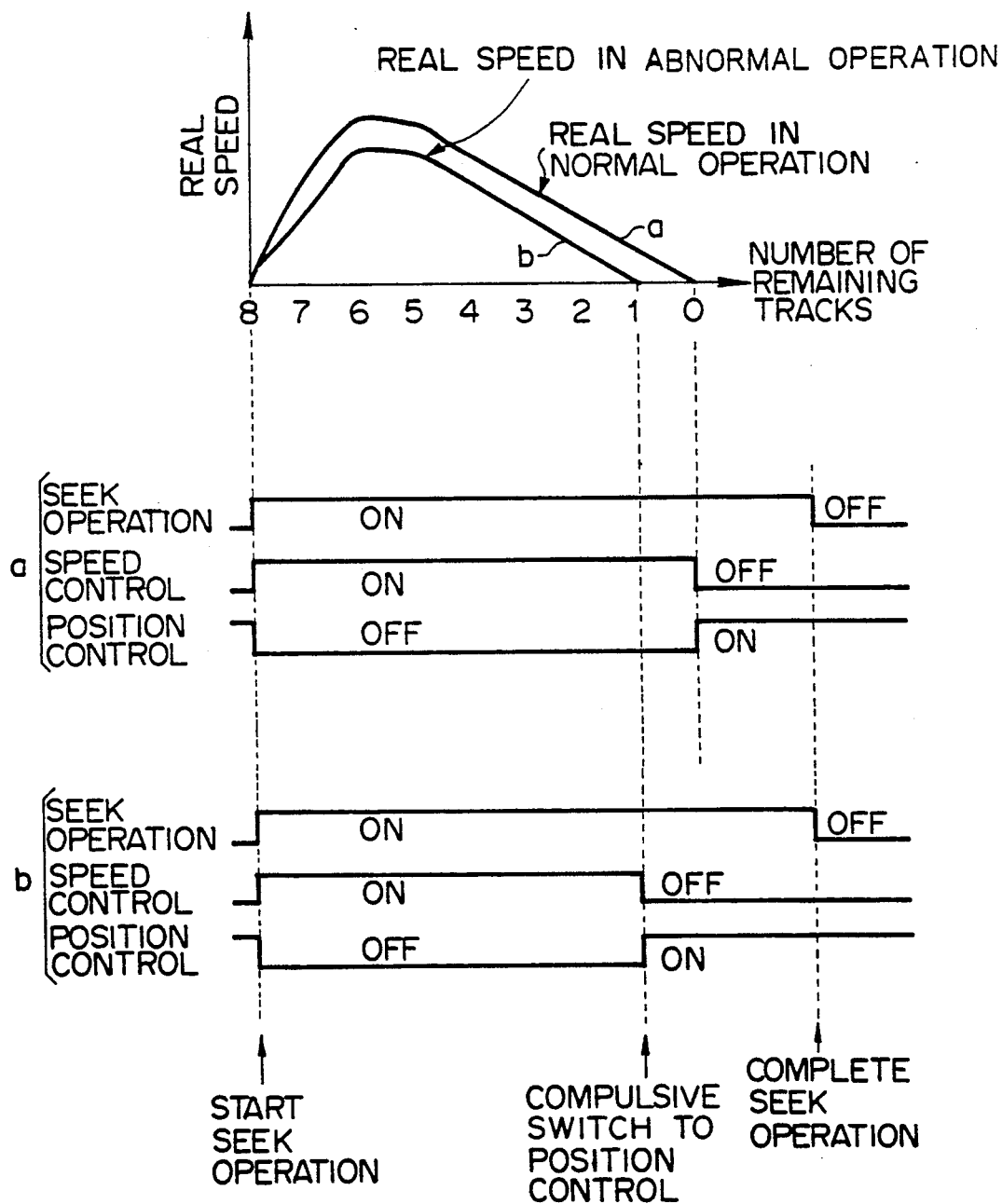
FIG. 16 is a diagram indicating example timing of the operation of FIG. 15.

FIG. 16 is a diagram indicating example timings of the operations of FIG. 15 for the case where the servo head 2 moves normally (which is indicated by "a"), and the servo head 2 unintentionally stops before the operation is switched to the position control (which is indicated by "b").

As shown in FIG. 16, when, the servo head 2 moves normally, the timing of the operation is the same as the operation without the steps 506, 507, and 509. When the servo head 2 unintentionally stops before the operation is switched to the position control, this stop is detected as the above time out in the step 509, and the control is immediately switched by the main processing unit 11 from the speed control to the position control, and thereby the servo head 2 is moved in the above range to be positioned to the desired (target) position by the position control.

Thus, according to the above operations in the embodiments of the first and second aspects of the present invention, an unintentional stop which may occur during a coarse (speed) control operation is automatically released so that an operation of positioning a head above a target track can be continued.

(5) Characteristic Functions in an Embodiment of the Third Aspect of the Present Invention Before, explaining the third aspect of the present invention, the return.to.zero operation is explained. Referring to FIG. 1, when an operation error occurs in the rotating disc device, the device must be reset to an initial position. Namely, the servo head must be positioned above the zero track. Although the operation to move the servo head to the zero track is carried out by speed control and position control, the procedure of the speed control is a little different from the above-mentioned general seek operation. Since, in the return-to-zero operation, generally, the initial position of the servo head is unknown, the difference value (the number of tracks over which the servo head is to be moved) is unknown. Therefore, the general return-to-zero operation is carried out in the following manner.

(a') First, a high speed return operation in the direction from the inner side to the outer side, is carried out until the aforementioned first guard band zone 6 (FIG. 1) is detected. The first guard band zone 6 can be detected by a demodulation circuit (not shown) because a special synchronization pattern is written on the first guard band zone 6. In the prior art, in the high speed return operation, the target speed is made constant throughout the movement.

(b') After the first guard band zone 6 is detected, a low speed return operation in the direction from the inner side to the outer side, is carried out until the aforementioned second guard band zone 7 (FIG. 1) is detected. The second guard band zone 7 can be detected by the above demodulation circuit (not shown) because a special synchronization pattern is written on the second guard band zone 7.

(c') After the second guard band zone 7 is detected, the direction of the movement is inverted, and a high speed return operation is carried out until the first guard band zone 6 is again detected.

(d') After the first guard band zone 7 is again detected, a low speed forward operation is carried out until the zero track is detected.

(e') After the zero track is detected, the control is switched from the speed control to the position control.

Since, as explained before, the moving speed in the high speed return operation in the above operation is small although it is called "high speed", the real speed may become very small when the speed control system is out of the optimum condition. This problem is solved by the following operation in the embodiment of the third aspect of the present invention.

Figure 17A:
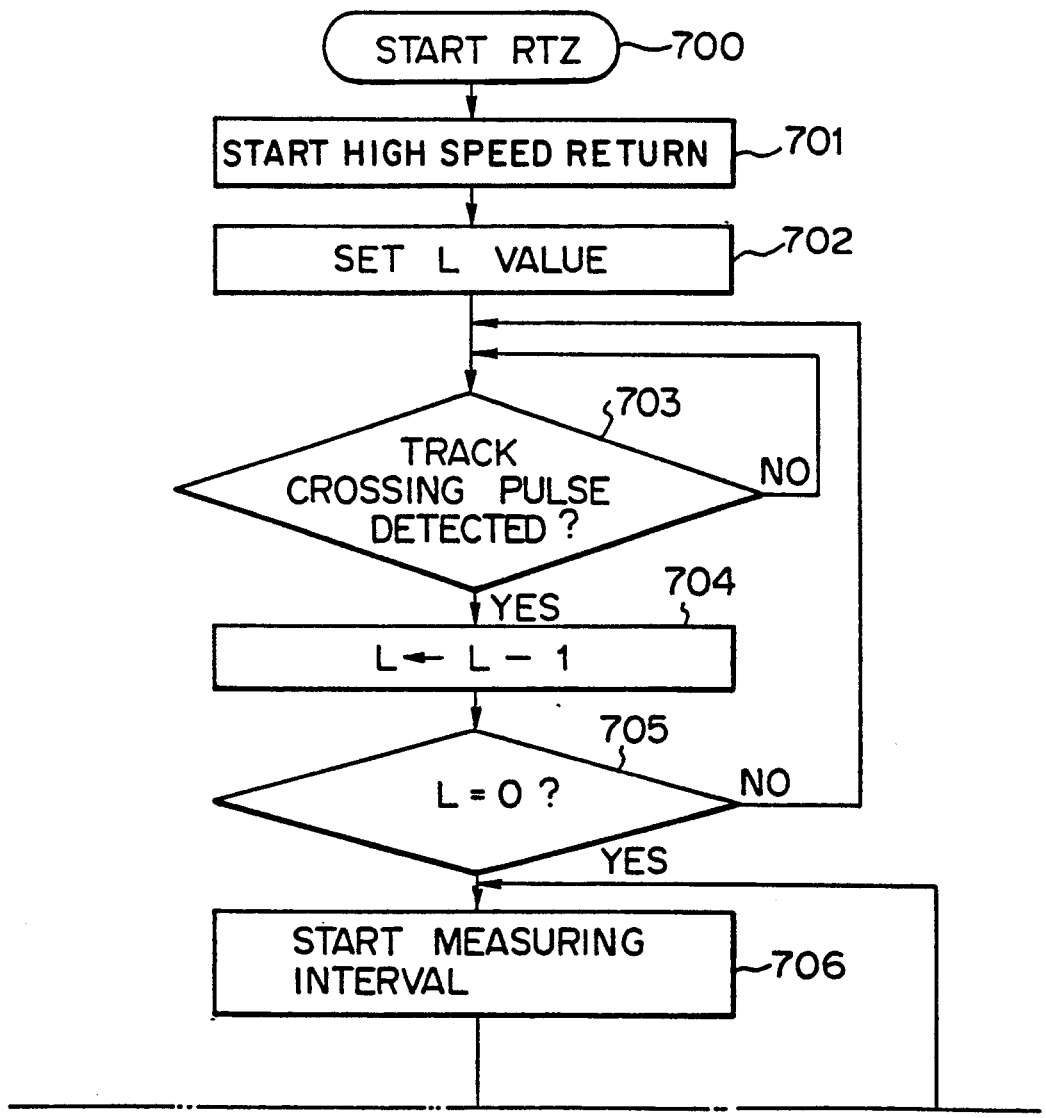
Figure 17B:
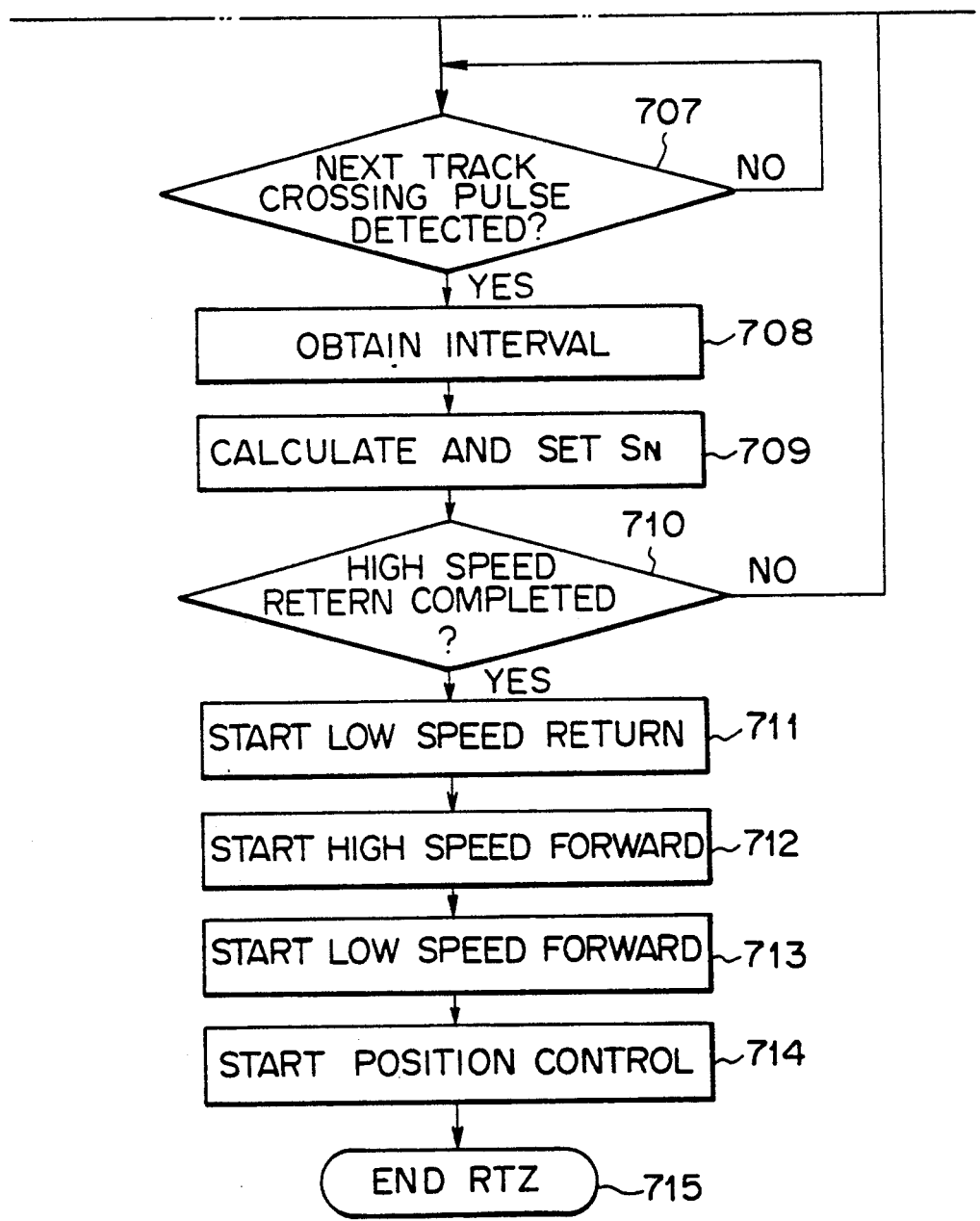

FIG. 17 is a flowchart indicating an operation according to the third aspect of the present invention.

In the step 700, the main processing unit 11 starts the return-to-zero operation. Then, in the step 701, the main processing unit 11 starts the above-mentioned high speed backward operation. In the step 702, the main processor unit 11 sets a value L in a register therein (not shown). The value L is predetermined based on the number of tracks over which the servo head is estimated to move in the beginning stage of the high speed return operation until the real speed of the servo head reaches the above-mentioned constant value.

Figure 18:
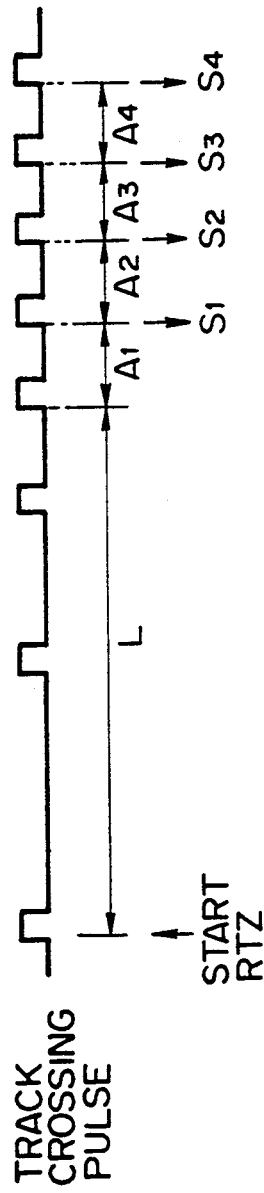
FIG. 18 is a diagram indicating example timing of detection of intervals of the track crossing pulses according to the third aspect of the present invention.

In the step 703, it is determined whether or not a track crossing pulse is detected. When YES is determined in the step 703, the operation goes to the step 704 to decrease the above set value L by one. Then, in the step 705, it is determined whether or not the set value L is equal to zero. When the set value L is determined to be not equal to zero in the step 705, the operation goes to the step 703. When the set value L is determined to be equal to zero in the step 705, the operation goes to the step 706, and the main processing unit 11 starts an operation for measuring an interval (time) between successive track crossing pulses. Then, when the next track crossing pulse is detected in the step 707, the interval is obtained in the step 708. For the measurement of the interval, the main processing unit 11 may have a counter which starts counting a clock when a track crossing pulse is detected in the step 703, and stops the counting when a track crossing pulse is detected in the step 707. Then, in the step 709, a modified target speed is calculated by the following equation.

$$SN = SN - 1 + (AN - T) \times M$$

where AN is a measured interval of the successive track crossing pulses, T is a standard interval corresponding to a standard speed of the servo head in the speed control operation in the return-to-zero operation, and M is a predetermined constant which is to be predetermined according to characteristics of the individual disc device. FIG. 18 is a diagram indicating example timing of detection of intervals of the track crossing pulses according to the third aspect of the present invention.

Figure 19:
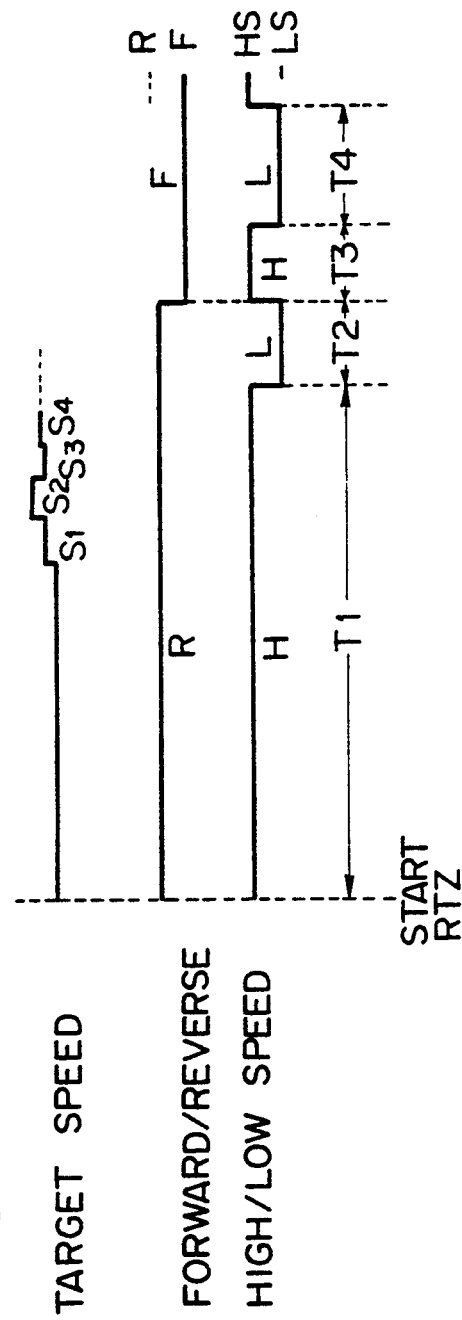
FIG. 19 is a diagram indicating example timing of the return-to-zero operation according to the third aspect of the present invention.

Next, when it is determined in the step 710 that the high speed return operation has not been completed, the operation return to the step 706. When it is determined in the step 710 that the high speed return operation has been completed, the operation goes to the step 711 to start the low speed return operation. Then, in the following steps 712 to 714, the above-mentioned operations (b') to (e') are carried out to position the servo head above the position of the target track center. FIG. 19 is a diagram indicating example timing of the return-to-zero operation according to the third aspect of the present invention. In FIG. 19, R denotes the return operation, F denotes the forward operation, H denotes the high speed, L denotes the low speed, and T1, T2, T3, and T4 respectively denote durations for the high speed return operation, the low speed return operation, the high speed forward operation, and the low speed forward operation. During the high speed return operation, the above modification of the target speed is carried out.

In the step 709 of the above operation, the gain in the target speed generating DAC 142 in the construction of FIG. 9 may be changed instead of the modification of the target speed. In this case, the gain is calculated by the above equation.

Thus, according to the above operation, a delay due to deviation from an optimum condition in a coarse (speed) control operation during a return-to-zero operation is automatically compensated.

I claim:

1. A track access control system for use in a rotating disc device comprising:
    a head for writing and/or reading digital data on a memory disc on which a plurality of tracks are provided;
    a moving means for moving said head over all of said tracks on said memory disc; and
    a servo control means for controlling said moving means so that said head is moved to and positioned above a target track;
    said servo control means comprises,
        a real speed detecting means for detecting a real speed of said head,
        a speed error obtaining means for obtaining a difference between said real speed and a target speed for moving said head,
        a speed control means for controlling said moving means so that said head is moved at a speed according to said difference so that said real speed approaches said target speed,
        a real position detecting means for detecting a real position of said head,
        a position control means for controlling said moving means so that said head is positioned above a target track, using the detected real position,
        a switching means for affecting the operation of said speed control means until the real position reaches a predetermined vicinity of said target track, and effecting the operation of said position control means after the real position reaches said predetermined vicinity,
        a timer starting position detecting means for detecting said head reaching a predetermined position out of said predetermined position, a timer for detecting a predetermined time elapsing from the time of said reaching of the head at said predetermined vicinity, and a target speed increasing means for forcedly increasing said target speed for use in the operation of said speed error obtaining means, when the elapse of the predetermined time is detected before the head reaches the predetermined vicinity.

2. A track access control system according to claim 1, wherein said target speed increasing means increases said target speed by multiplying said target speed by a predetermined factor.

3. A track access control system according to claim 1, wherein said target speed increasing means increases said target speed by adding a predetermined value to said target speed.

4. A track access control system according to claim 1, wherein said target speed increasing means increases said target speed for a duration, and returns the value of the target speed to the value which the target speed had before the increase, after the duration.

5. A track access control system according to claim 4, wherein said duration is changed according to the number of tracks which ranges from., the position where the servo head is at the instant, to said target track.

6. A track access control system according to claim 4, further comprising:

an increase effect confirming means for detecting whether or not the servo head reaches said predetermined vicinity after a previous operation of the target speed by the target speed increase means, and an increase repeat means for affecting the operation of said target speed increase means again when said increase effect confirming means does not detect said reaching of said head at said predetermined vicinity after a previous operation of the target speed by the target speed increase means.

7. A track access control system according to claim 1, wherein said predetermined position is two track widths before reaching said predetermined vicinity.

8. A track access control system according to claim 1, wherein said predetermined position is 2.5 track widths before a center of said target track.

9. A track access control system for use in a rotating disc device comprising:

a head for writing and/or reading digital data on a memory disc on which a plurality of tracks are provided;

a moving means for moving said head over all of said tracks on said memory disc; and a servo control means for controlling said moving means so that said head is moved to and positioned above a target track;

said servo control means comprises, a real speed detecting means for detecting a real speed of said head, a speed control means for controlling said moving means so that said head is moved to a predetermined vicinity of a target track, using the detected real speed, a real position detecting means for detecting a real position of said head, a position control means for controlling said moving means so that said head is positioned above a target track, using the detected real position, a switching means for affecting the operation of said speed control means until the real position reaches said predetermined vicinity, and effecting the operation of said position control means after the real position reaches said predetermined vicinity, a timer starting position detecting means for detecting said head reaching a predetermined position which is out of said predetermined vicinity, a timer for detecting a predetermined time elapsing from the time of said reaching of the head at said predetermined position, and a forced switching means for effecting the operation of said position control means when the elapse of the predetermined time is detected before the head reaches the predetermined vicinity.

10. A track access control system for use in a rotating disc device comprising:

a head for writing and/or reading digital data on a memory disc on which a plurality of tracks are provided;

a moving means for moving said head over all of said tracks on said memory disc; and a servo control means for controlling said moving means so that said head is moved to and positioned above a target track;

said servo control means comprises, a real speed detecting means for detecting a real speed of said head, a speed error obtaining means for obtaining a difference between said real speed and a target speed for moving said head, a speed control means for controlling said moving means so that said head is moved at a speed according to said difference so that said real speed approaches said target speed, a track crossing timing detecting means for detecting a time said head passes over each track on said memory disc, an interval detecting means for detecting an interval between times said head passes over different tracks, an interval comparing means for comparing said interval with a reference interval which is predetermined corresponding to a target speed for a return-to-zero operation, and a target speed modifying for forcedly modifying said target speed for the use in the operation of said speed error obtaining means, based on a result of the operation in said interval comparing means, in said return-to-zero operation.

11. A track access control system according to claim 10, wherein said target speed modifying means changes said target speed based on a difference between said detected interval and a standard interval corresponding to a standard speed of said servo head in said seed control operation in the return-to-zero operation.

12. A track access control system according to claim 10, wherein the operation of said target speed modifying means begins after the servo head has moved over a predetermined number of tracks after beginning of the operation of said speed control means in the return-to-zero operation.

* * * * *